(12) United States Patent
Chatani

(10) Patent No.: US 9,286,053 B2
(45) Date of Patent: Mar. 15, 2016

(54) USER SUPPORT SYSTEM, USER SUPPORT METHOD, AND MANAGEMENT SERVER FOR SUPPORTING USER OF PORTABLE INFORMATION TERMINAL

(75) Inventor: Masayuki Chatani, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 818 days.

(21) Appl. No.: 13/609,498

(22) Filed: Sep. 11, 2012

(65) Prior Publication Data

US 2013/0006389 A1 Jan. 3, 2013

Related U.S. Application Data

(63) Continuation of application No. PCT/JP2011/000899, filed on Feb. 18, 2011.

(30) Foreign Application Priority Data

Apr. 14, 2010 (JP) .................................. 2010-093518

(51) Int. Cl.
*G05B 15/02* (2006.01)
*G05B 19/18* (2006.01)
(Continued)

(52) U.S. Cl.
CPC ......................................... *G06F 8/65* (2013.01)

(58) Field of Classification Search
CPC ......... H04B 5/02; H04H 20/28; H04H 20/38; H04H 60/27; H04H 60/32; H04H 60/37; H04H 60/46; H04H 60/58; H04H 60/64; H04H 60/65; H04H 60/72; H04H 60/73; H04H 60/91; H04H 60/94; H04W 12/02; H04N 7/165; H04L 12/56

USPC ......... 709/200; 715/744; 718/100; 725/9, 14, 725/39; 235/454; 370/400; 463/40; 380/270
See application file for complete search history.

(56) References Cited

U.S. PATENT DOCUMENTS 7,558,820 B2 7/2009 Kimoto et al.
2002/0184366 A1 12/2002 Kimoto et al.
(Continued)

FOREIGN PATENT DOCUMENTS

CN 1288539 3/2001
CN 101454754 6/2009
(Continued)

OTHER PUBLICATIONS

Notification of Reason(s) for Refusal dated Oct. 15, 2013, from corresponding Japanese Application No. 2010-093518.
(Continued)

*Primary Examiner* — Mohammad Ali
*Assistant Examiner* — Md Azad
(74) *Attorney, Agent, or Firm* — Katten Muchin Rosenman LLP

(57) ABSTRACT

A management server comprises: a control program storing unit which stores control programs of multiple types that correspond to respective user skill levels, which allow the user to remotely control an apparatus via a portable information terminal; a device information acquisition unit which acquires device information with respect to the apparatus to be controlled; a history acquisition unit which acquires the user's operation history; a control program judgment unit which judges the control program type to be transmitted based upon the operation history; and a version management unit which transmits the latest-version control program when a control program already transmitted to the portable information terminal does not match the latest version. When the latest-version control program is transmitted to the portable information terminal, the control program judgment unit again judges the control program type to be transmitted, based upon the user's operation history.

9 Claims, 18 Drawing Sheets

(51) Int. Cl.
*H04M 3/493* (2006.01)
*H04M 1/00* (2006.01)
*H04N 7/16* (2011.01)
*H04H 60/33* (2008.01)
*H04H 60/32* (2008.01)
*G06F 3/00* (2006.01)
*G06F 13/00* (2006.01)
*G06F 15/16* (2006.01)
*G06F 9/46* (2006.01)
*G06F 7/00* (2006.01)
*G06F 9/445* (2006.01)

(56) References Cited

U.S. PATENT DOCUMENTS

| | | | |
|---|---|---|---|
| 2003/0189509 | A1 | 10/2003 | Hayes et al. |
| 2006/0050865 | A1 | 3/2006 | Kortum et al. |
| 2006/0271934 | A1* | 11/2006 | Ezaki ............................. 718/100 |
| 2008/0106514 | A1 | 5/2008 | Urashima et al. |
| 2008/0282288 | A1* | 11/2008 | Heo ................................. 725/39 |
| 2009/0282001 | A1* | 11/2009 | Fukuda ............................. 707/3 |
| 2009/0298535 | A1* | 12/2009 | Klein et al. ................. 455/556.1 |
| 2011/0007901 | A1* | 1/2011 | Ikeda et al. .................... 380/270 |
| 2012/0030697 | A1* | 2/2012 | Yamamoto ...................... 725/14 |

FOREIGN PATENT DOCUMENTS

| | | |
|---|---|---|
| JP | 2000-66789 | 3/2000 |
| JP | 2002-281215 | 9/2002 |
| JP | 2002-291072 | 10/2002 |
| JP | 2003-58395 | 2/2003 |
| JP | 2003-324779 | 11/2003 |
| JP | 2004-254070 | 9/2004 |
| JP | 2004-355563 | 12/2004 |
| JP | 2005-63069 | 3/2005 |
| JP | 2006-227859 | 8/2006 |
| JP | 2008-118572 | 5/2008 |
| WO | 00/17738 | 3/2000 |
| WO | WO-0017738 * 3/2000 | ................ G06F 3/00 |

OTHER PUBLICATIONS

Chinese First Office Action dated Dec. 1, 2014 from corresponding Application No. 201180018648.6.

European Search Report dated May 2, 2014 from corresponding Application No. 11768576.8.

Krzysztof Z. Gajos, et. al., "Decision-Theoretic User Interface Generation", Proceedings of the AAAI Nectar Papers Track at the Twenty-Third AAAI Conference on Artificial Intelligence, AAAI '08, Chicago, USA, Jul. 13, 2008, pp. 1532-1536, Retrieved from the Internet: URL:http://faculty.washington.edu/wobbrock/pubs/aaai-08.pdf, retrieved on Apr. 22, 2014.

International Search Report dated Apr. 5, 2011, from corresponding International Application No. PCT/JP2011/000899.

International Preliminary Report on Patentability and Written Opinion of the International Searching Authority dated Nov. 6, 2012 from corresponding International Application No. PCT/JP2011/000899.

* cited by examiner

FIG. 12

| MODEL NUMBER 130 | CONTROL PROGRAM ID 131 | LATEST VERSION 132 | NUMBER OF TYPES 133 | CONDITION 134 | |
|---|---|---|---|---|---|
| 0001 | 0001 | 1.1 | 3 | OPERATE 50 TIMES OR MORE | USE EGP 10 TIMES OR MORE |
| 0002 | 0002 | 3.0 | 2 | OPERATE 10 TIMES OR MORE | — |
| 0003 | 0003 | 2.41 | 4 | OPERATE 5 TIMES OR MORE | 30 DAYS AFTER LAST DOWNLOAD |
| ⋮ | ⋮ | ⋮ | ⋮ | ⋮ | ⋮ |

| USER ID 140 | MODEL NUMBER 141 | CONTROL PROGRAM ID 142 | TYPE 143 | VERSION 144 | HISTORY | | | 145 | SKILL LEVEL 146 | TYPE SPECIFI- CATION 147 |
|---|---|---|---|---|---|---|---|---|---|---|
| | | | | | OPERATION | CHANGE SETTINGS | USE EPG | | | |
| 0001 | 0002 | 0002 | 2 | 2.8 | 32 | 3 | | .. | 3 | 2 |
| 0002 | 0001 | — | — | — | 13 | — | | .. | — | — |
| 0003 | 0003 | 0003 | 3 | 2.41 | 74 | 12 | | .. | 7 | — |
| .. | .. | .. | .. | .. | .. | .. | | .. | .. | .. |

193

USER SUPPORT SYSTEM, USER SUPPORT METHOD, AND MANAGEMENT SERVER FOR SUPPORTING USER OF PORTABLE INFORMATION TERMINAL

BACKGROUND OF THE INVENTION

1. Field of the Invention

The present invention relates to a technique for supporting the user of a portable information terminal.

2. Description of the Related Art

Cellular phone terminals and portable information terminals have become broadly popular. Today, most people possess a cellular phone terminal or a portable information terminal. In addition, control programs have become available which allow such a highly-used cellular phone terminal or portable information terminal to function as a remote controller configured to remotely control a consumer electronics device or the like.

There is a demand for a service which is configured such that, before the user is supplied with such a control program via the user's portable information terminal or the like, the user's skill level is estimated based upon the user action history or the like, and a control program suitable for the user is supplied, which is convenient. As a technique for acquiring and analyzing log information which specifies the user action history, Patent document 1 is known, for example.

RELATED ART DOCUMENTS

Japanese Patent Application Laid Open No. 2003-58395 (which corresponds to U.S. Pat. No. 7,558,820)

However, in some cases, after the user operates such a control program many times, the user becomes accustomed to the operation of the control program, and the user desires a control program which allows the user to perform more advanced operations. Conversely, in some cases, after the user does not operate the control program for a long period of time, the user forgets how to operate the control program, and accordingly, the user desires a control program which allows the user to perform simpler operations. There is a demand for a technique for appropriately supporting the users of such a portable information terminal according to different varieties of user's skill level.

SUMMARY OF THE INVENTION

Accordingly, it is a general purpose of the present invention to provide a technique for supporting the user of a portable information terminal, and to provide improved convenience for the user.

In order to solve the aforementioned problem, a management server according to an embodiment of the present invention comprises: a control program storing unit configured to store multiple types of control programs that correspond to skill levels of a user of a portable information terminal with respect to an apparatus to be controlled, as control programs which allow the user to remotely control the apparatus to be controlled via the portable information terminal; a control program request receiving unit configured to receive a request for the control program from the portable information terminal; a device information acquisition unit configured to acquire device information with respect to the apparatus to be controlled; a history acquisition unit configured to acquire a user's operation history for the apparatus to be controlled; a control program judgment unit configured to judge, based upon the operation history, the control program type to be transmitted to the portable information terminal; a control program transmitting unit configured to read out the control program of the type thus judged from the control program storing unit, and to transmit the control program thus read out to the portable information terminal; and a version management unit configured to check whether or not the version of a control program that has already been transmitted to the portable information terminal matches a most recent version of the control program stored in the control program storing unit, and to instruct the control program transmitting unit to transmit the most recent version of the control program to the portable information terminal when the version thus checked does not match the most recent version. When the control program transmitting unit transmits the most recent version of the control program to the portable information terminal, the control program judgment unit is configured to again acquire the user's operation history for the apparatus to be controlled, and to judge, based upon the operation history, the control program type to be transmitted to the portable information terminal.

A portable information terminal according to an embodiment of the present invention comprises: a device information acquisition unit configured to acquire, from an apparatus to be controlled, device information with respect to the apparatus to be controlled; a control program request unit configured to notify a management server of the device information with respect to the apparatus to be controlled, and to request the management server to transmit a control program for remotely controlling the apparatus to be controlled; a control program acquisition unit configured to acquire the control program from the management server, and to instruct a control program storing unit to store the control program thus acquired; a control program executing unit configured to execute the control program stored in the control program storing unit so as to remotely control the apparatus to be controlled; a history recording unit configured to instruct a history storing unit to record operation history for the apparatus to be controlled by means of the control program; a history transmitting unit configured to transmit the operation history held by the history storing unit to the management server; and a version checking unit configured to request the management server to check whether or not the control program stored in the control program storing unit matches a most recent version. When the control program stored in the control program storing unit does not match the most recent version, the control program acquisition unit is configured to acquire, from the management server, the most recent version of the control program of a type judged based upon the operation history.

It should be noted that any combination of the aforementioned components or any manifestation of the present invention may be mutually substituted between a method, apparatus, system, recording medium, computer program, and so forth, which are effective as an embodiment of the present invention.

Figure 4A:
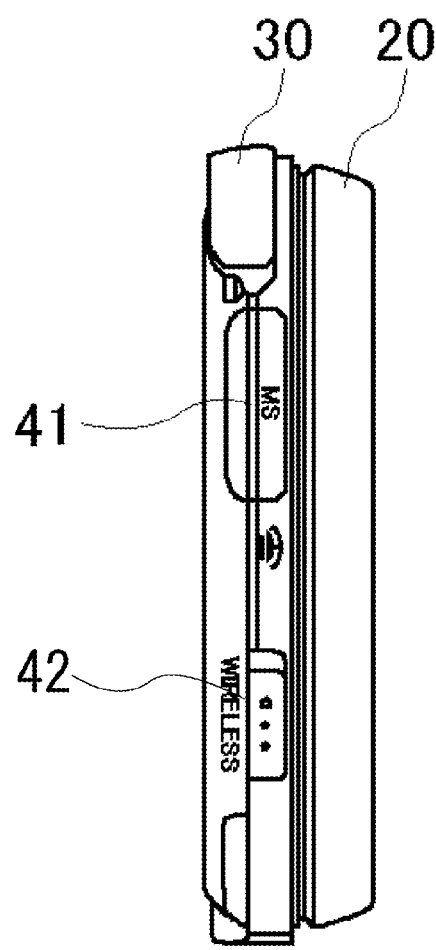
Figure 4B:
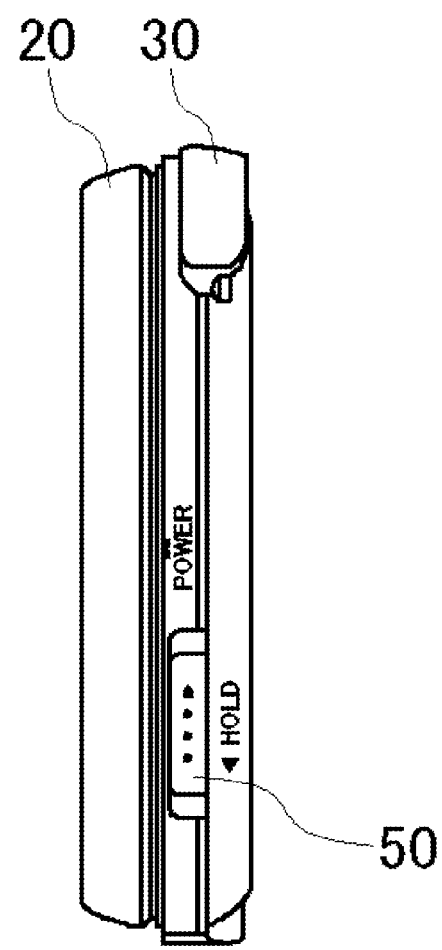
Figure 5:
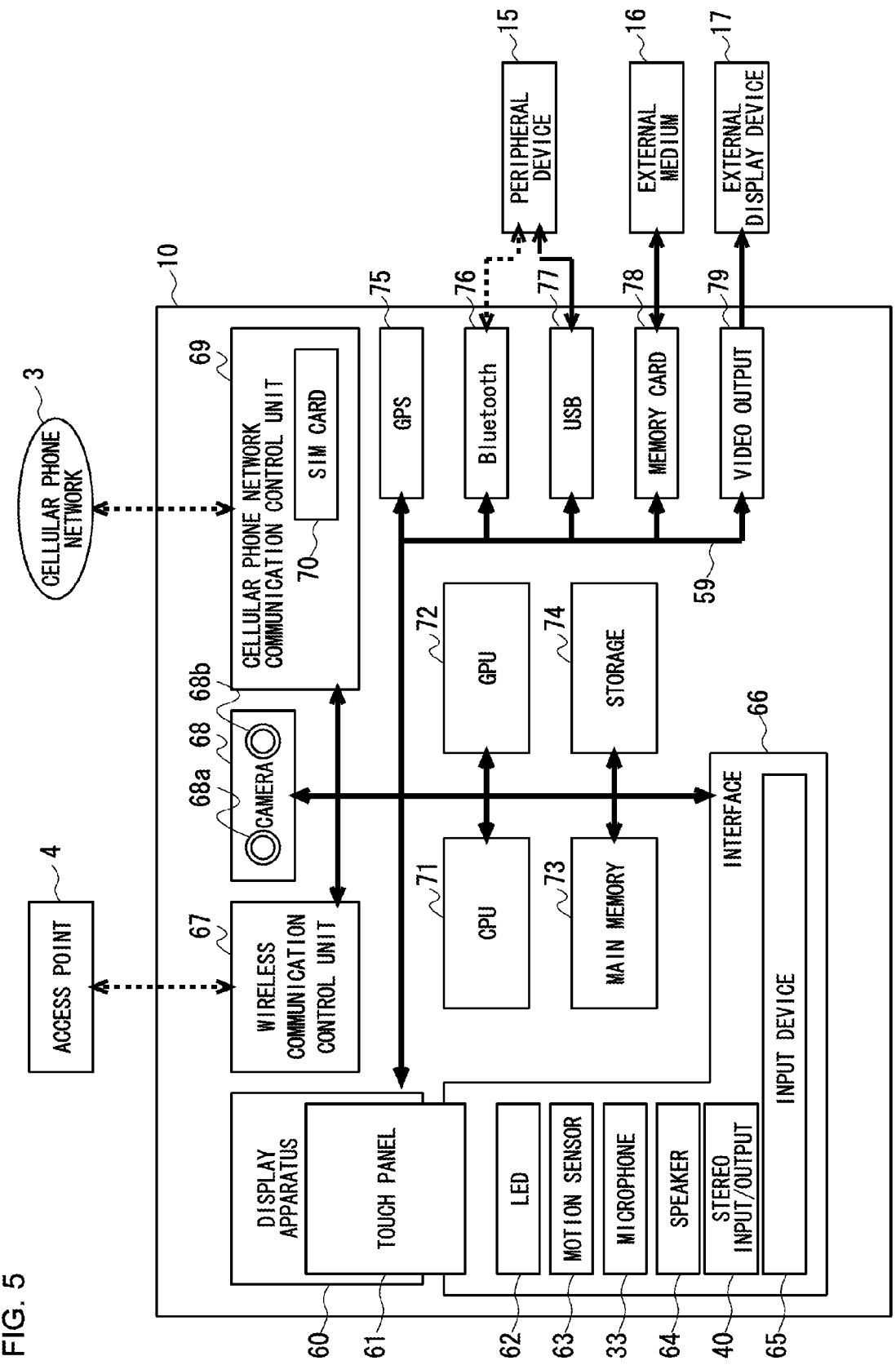
Figure 6:
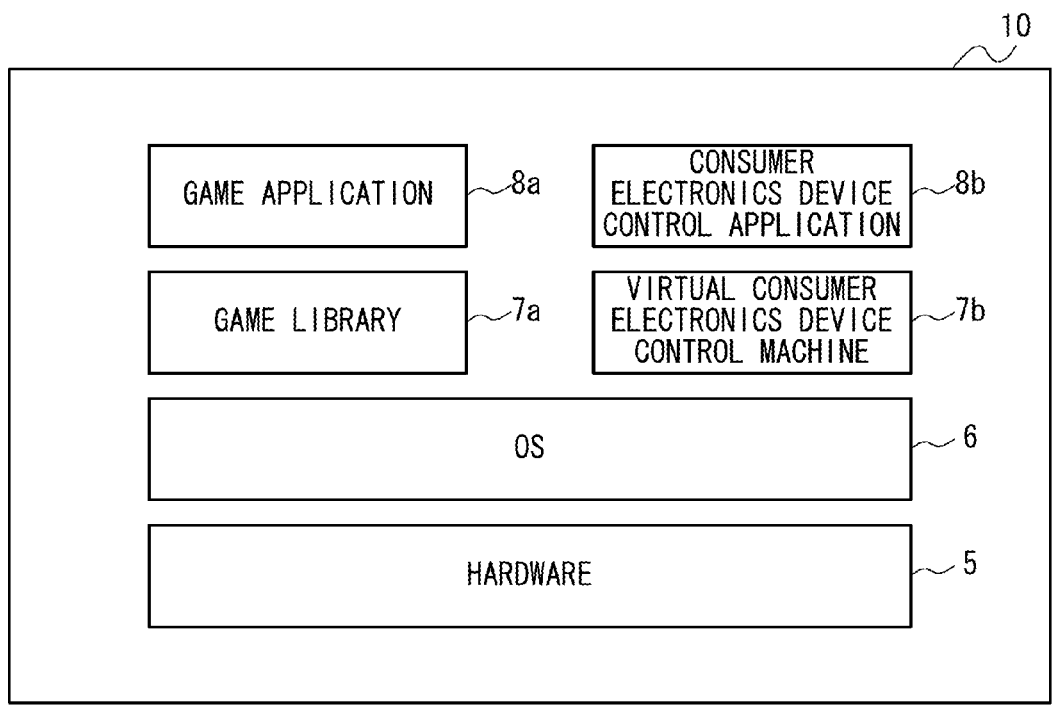
Figure 7:
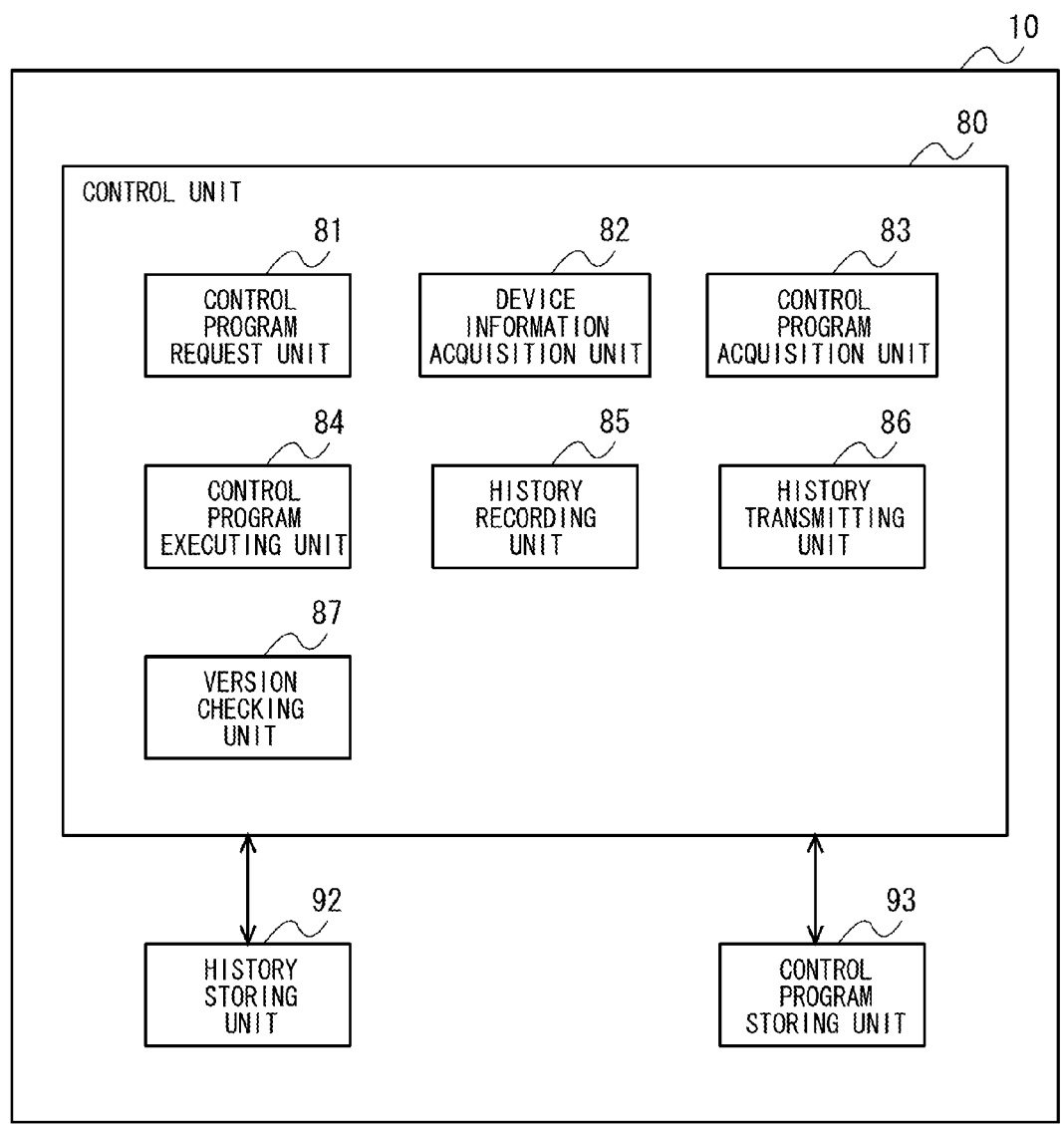
Figure 8:
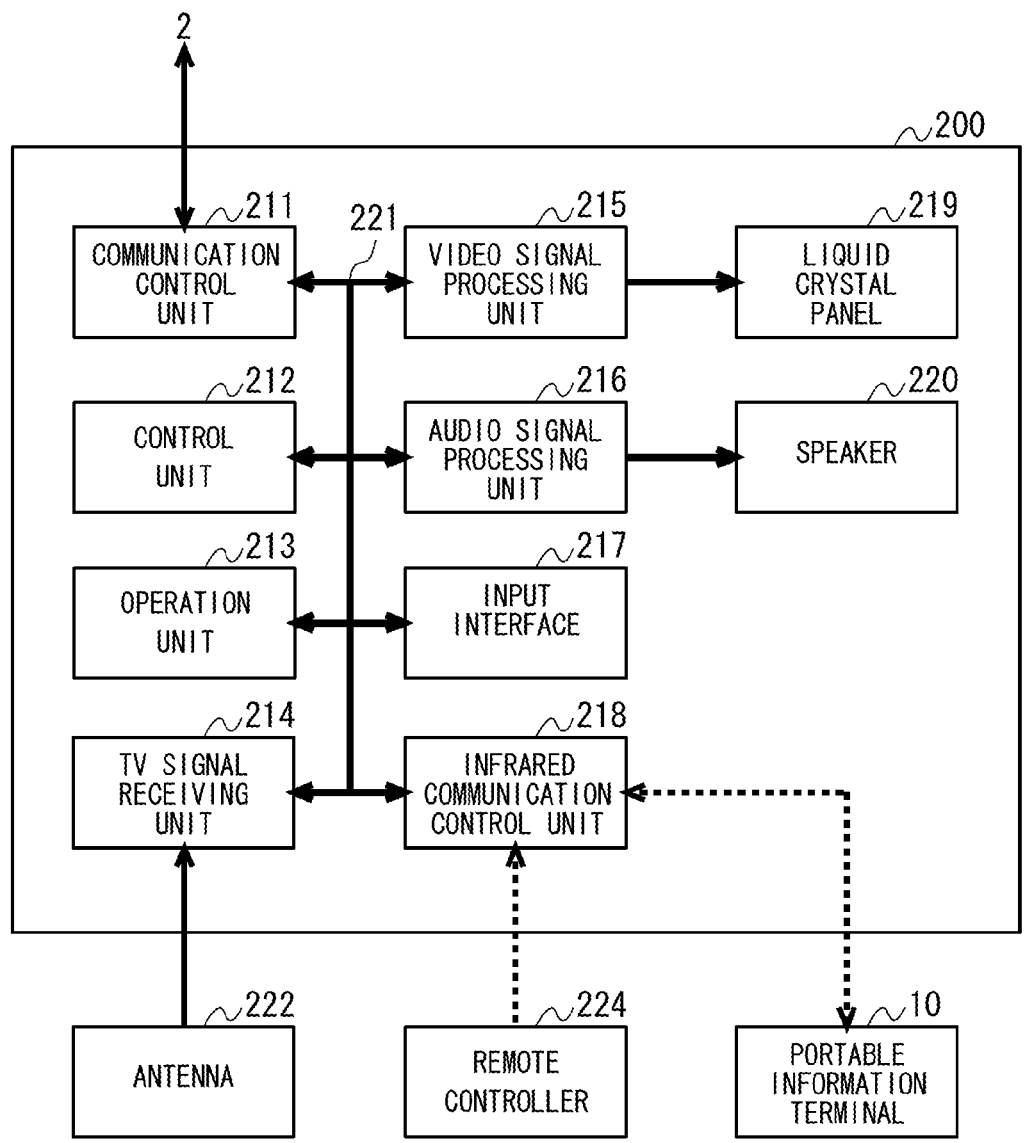
Figure 9:
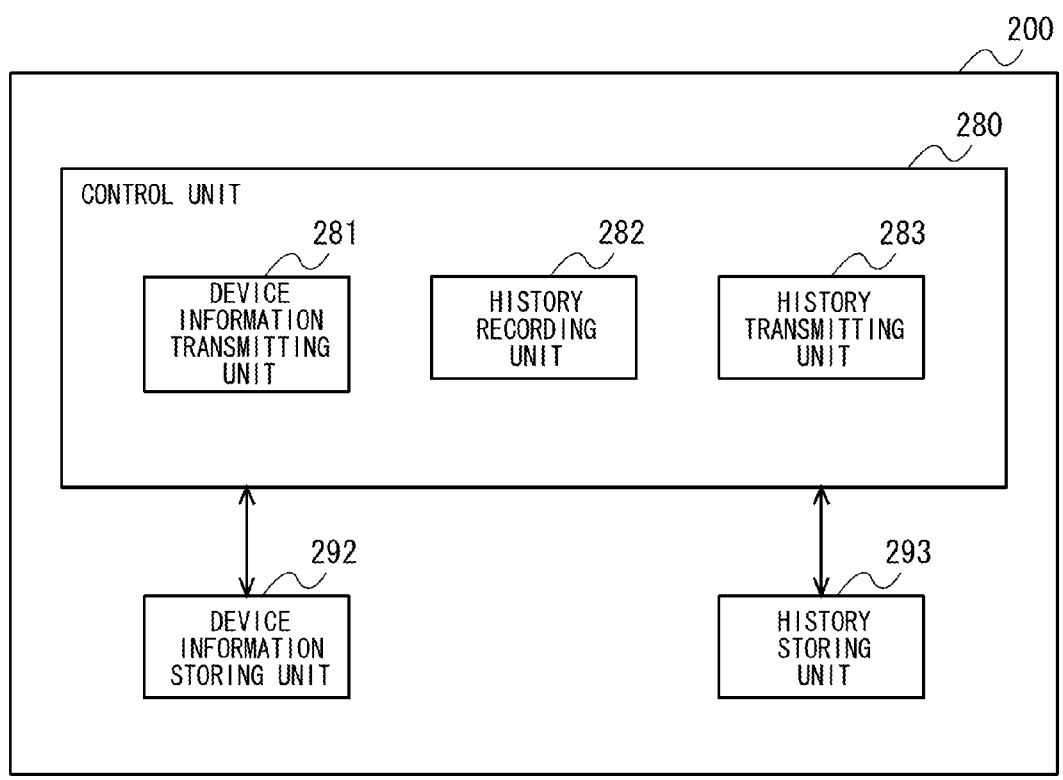
Figure 10:
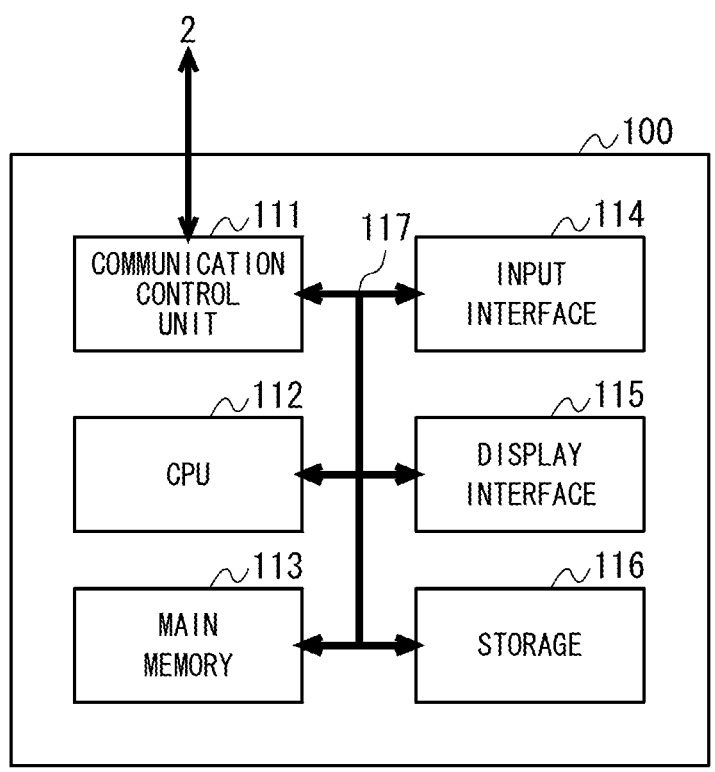
Figure 11:
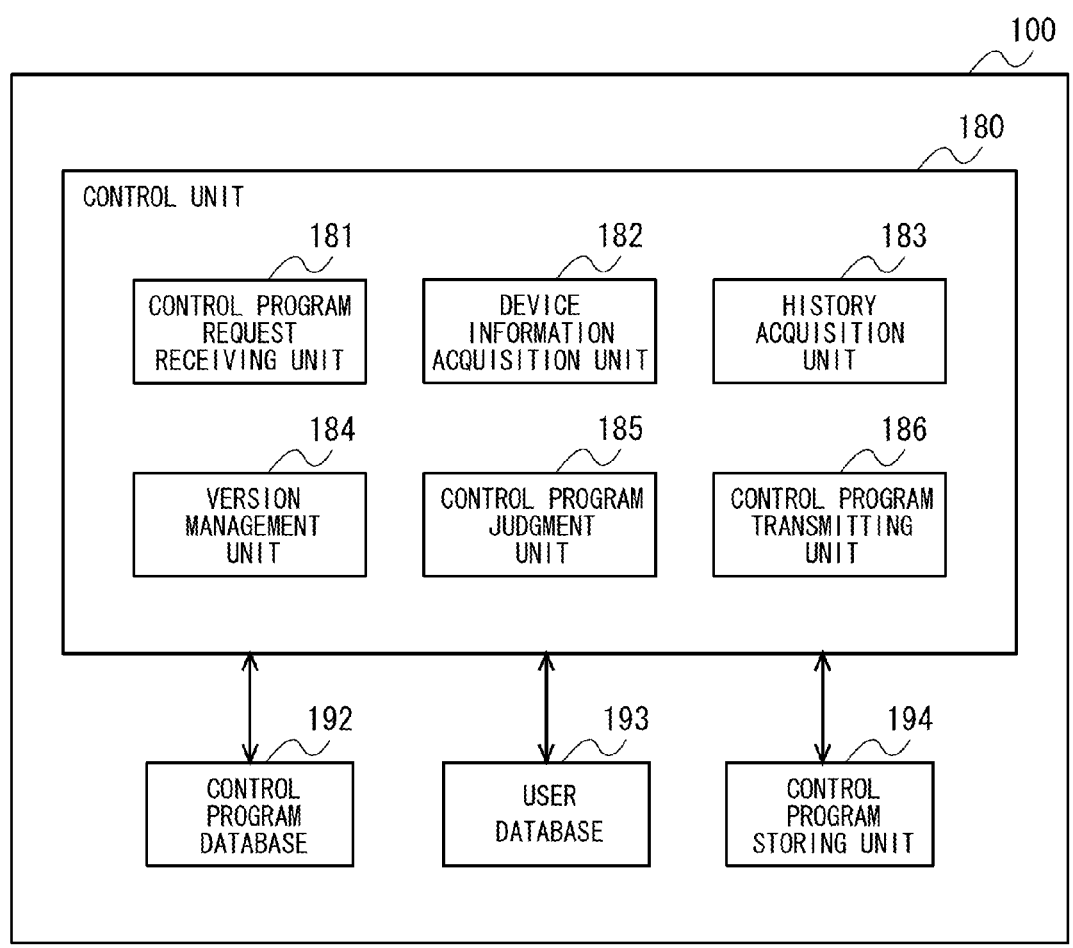
Figure 14:
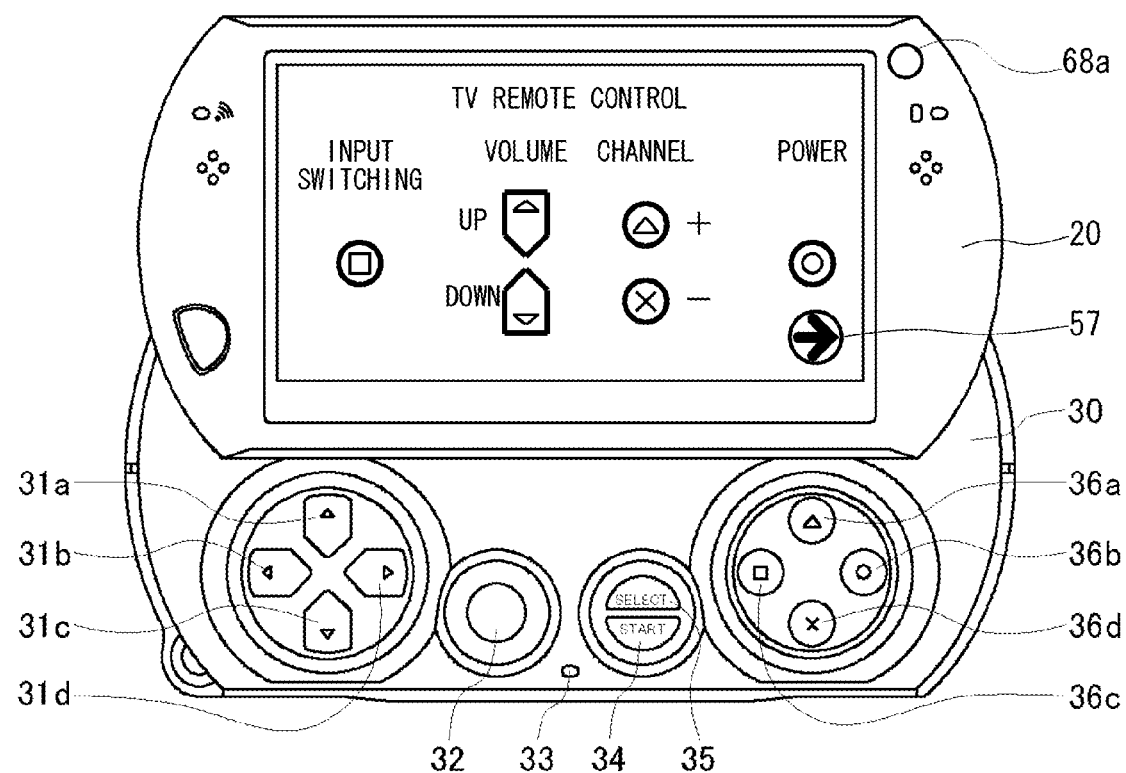
Figure 15:
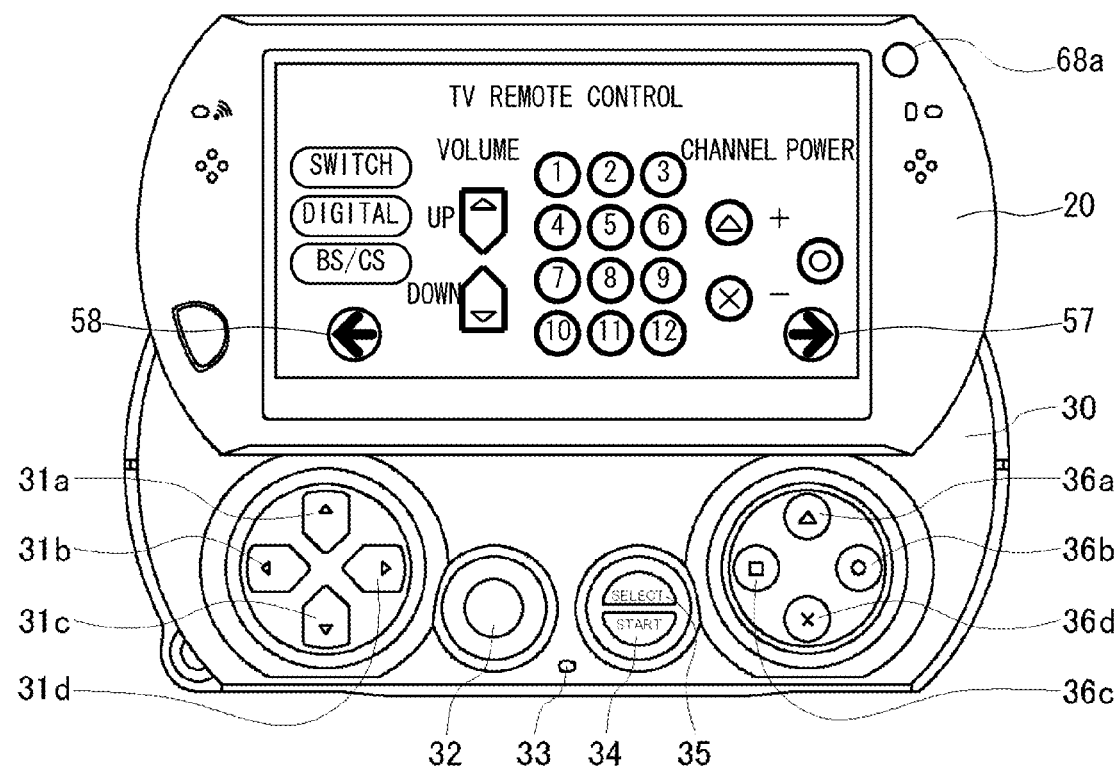
Figure 16:
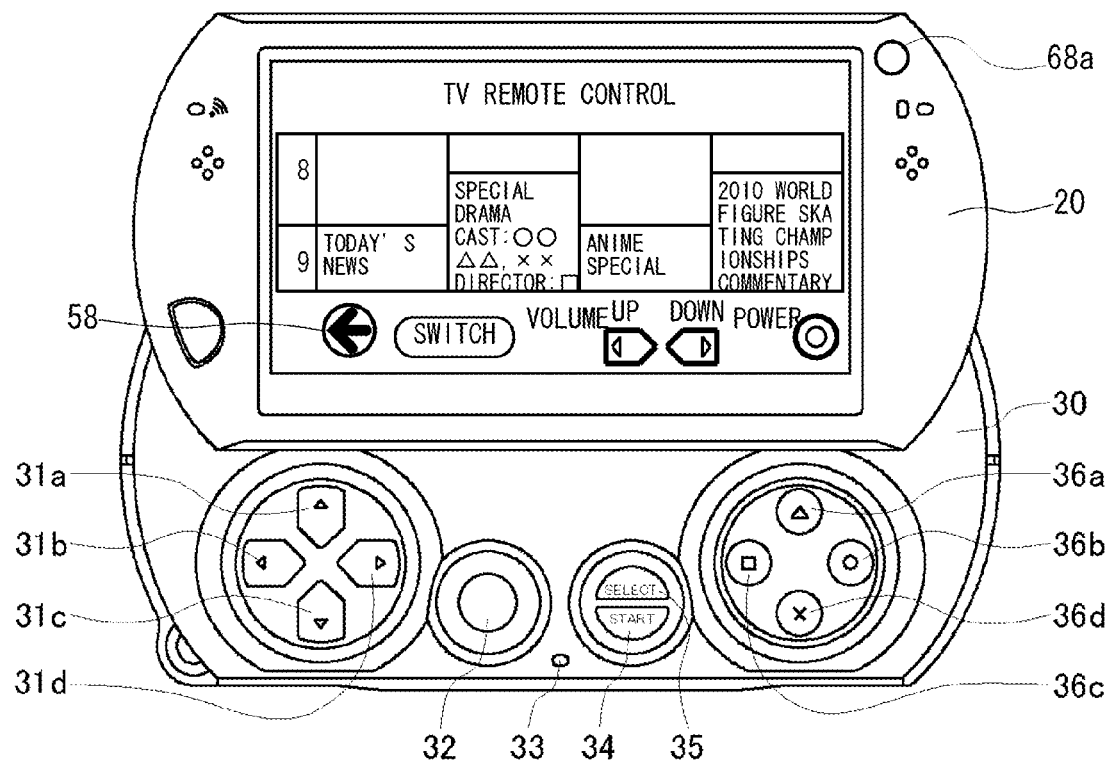
Figure 17:
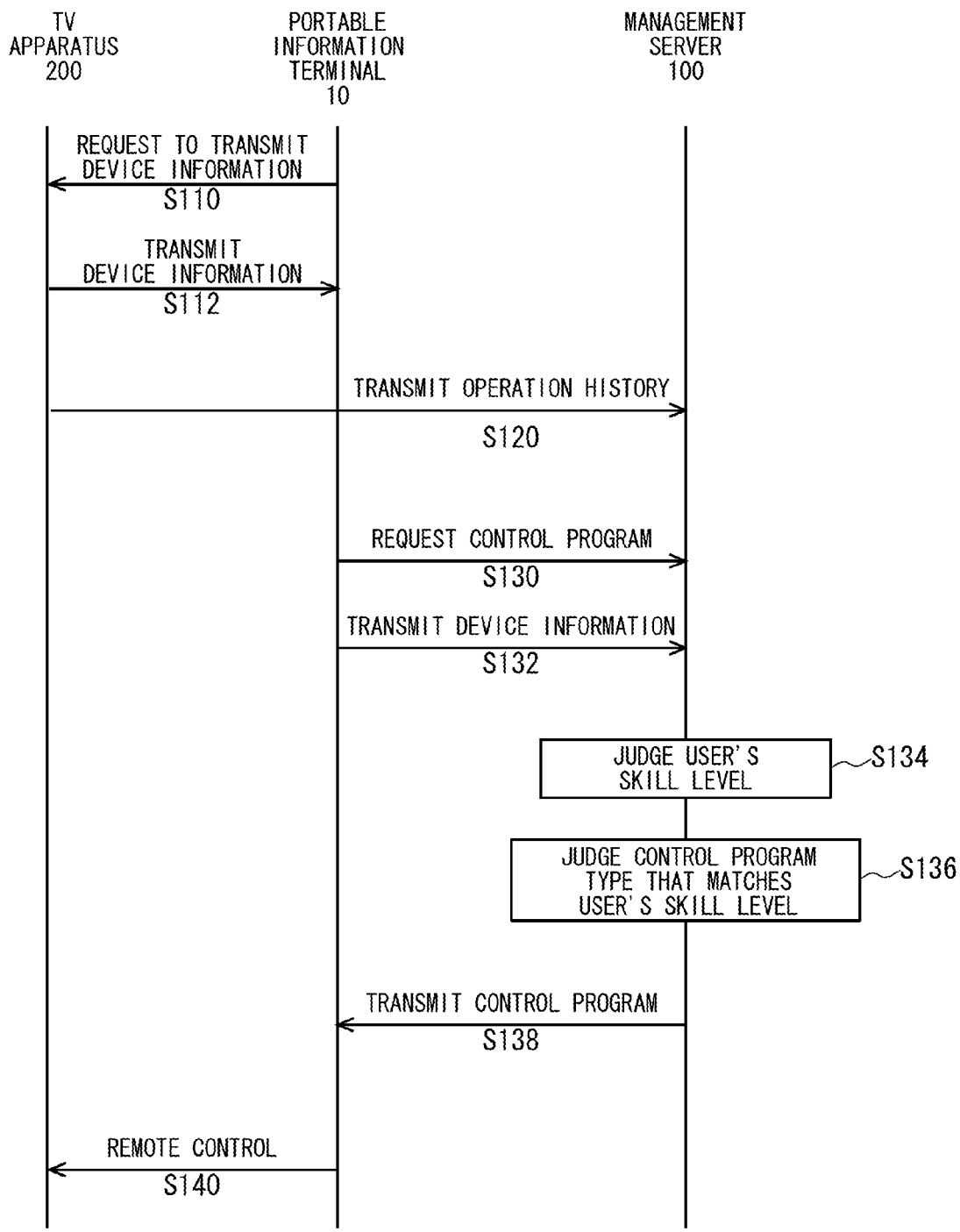
Figure 18:
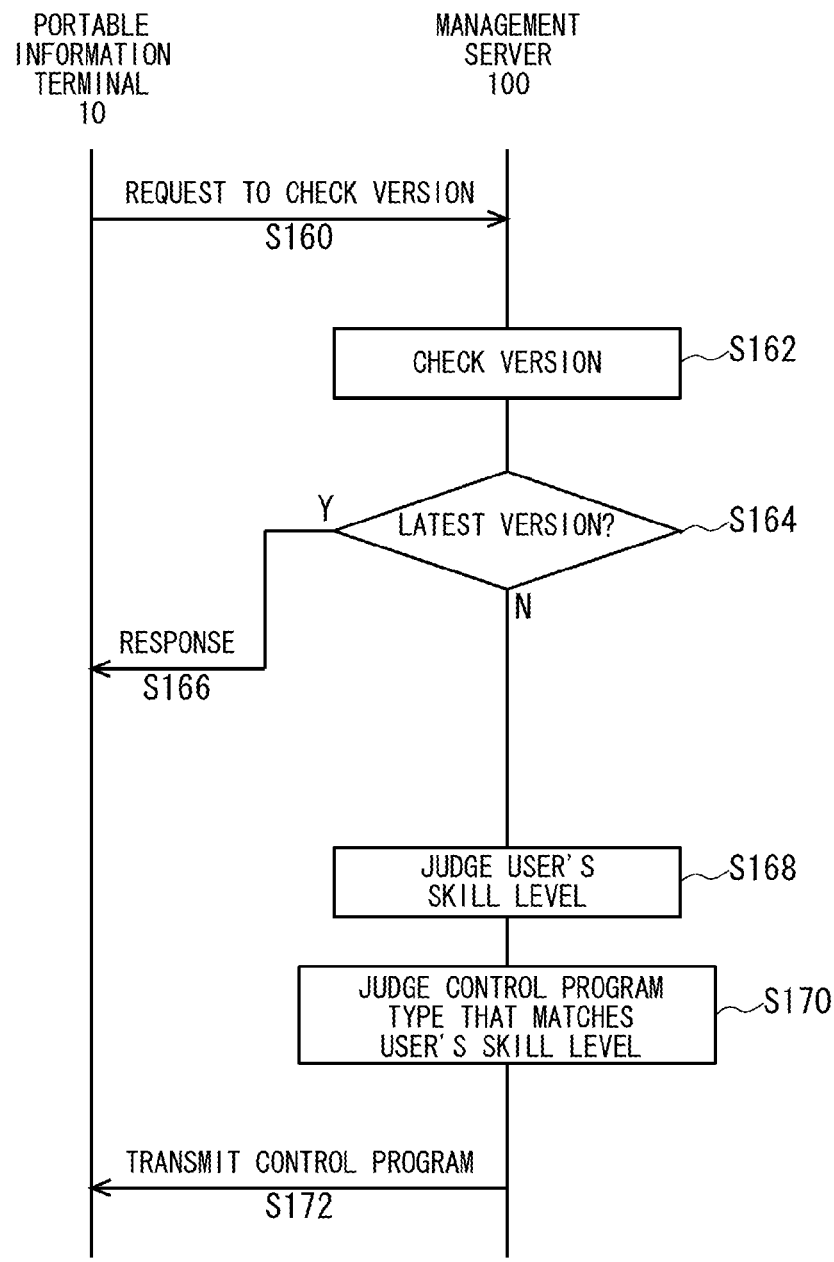

3B is a view showing the lower face of the portable information terminal according to the embodiment;

FIG. 4A is a view showing the left side face of the portable information terminal according to the embodiment, and FIG. 4B is a view showing the right side face of the portable information terminal according to the embodiment;

FIG. 5 is a diagram which shows a circuit configuration of the portable information terminal according to the embodiment;

FIG. 6 is a schematic diagram which shows a computer architecture of the portable information terminal according to the embodiment;

FIG. 7 is a diagram which shows a functional configuration of the portable information terminal according to the embodiment;

FIG. 8 is a diagram which shows a circuit configuration of a TV apparatus according to an embodiment;

FIG. 9 is a diagram which shows a functional configuration of the TV apparatus according to the embodiment;

FIG. 10 is a diagram which shows a circuit configuration of a management server according to an embodiment;

FIG. 11 is a diagram which shows a functional configuration of the management server according to the embodiment;

FIG. 12 is a diagram which shows an example of an internal data structure of a control program database according to an embodiment;

FIG. 13 is a diagram which shows an example of an internal data structure of a user database according to an embodiment;

FIG. 14 is a view showing an example of a screen displayed on a display by means of a beginner-level control program;

FIG. 15 is a view showing an example of a screen displayed on a display by means of an intermediate-level control program;

FIG. 16 is a view showing an example of a screen displayed on a display by means of an advanced-level control program;

FIG. 17 is a sequence diagram which shows a procedure of a user support method according to an embodiment; and FIG. 18 is a sequence diagram which shows a procedure for managing the version of a control program using the user support method according to the embodiment.

DETAILED DESCRIPTION OF THE INVENTION

The invention will now be described by reference to the preferred embodiments. This does not intend to limit the scope of the present invention, but to exemplify the invention.

First Embodiment

Figure 1:
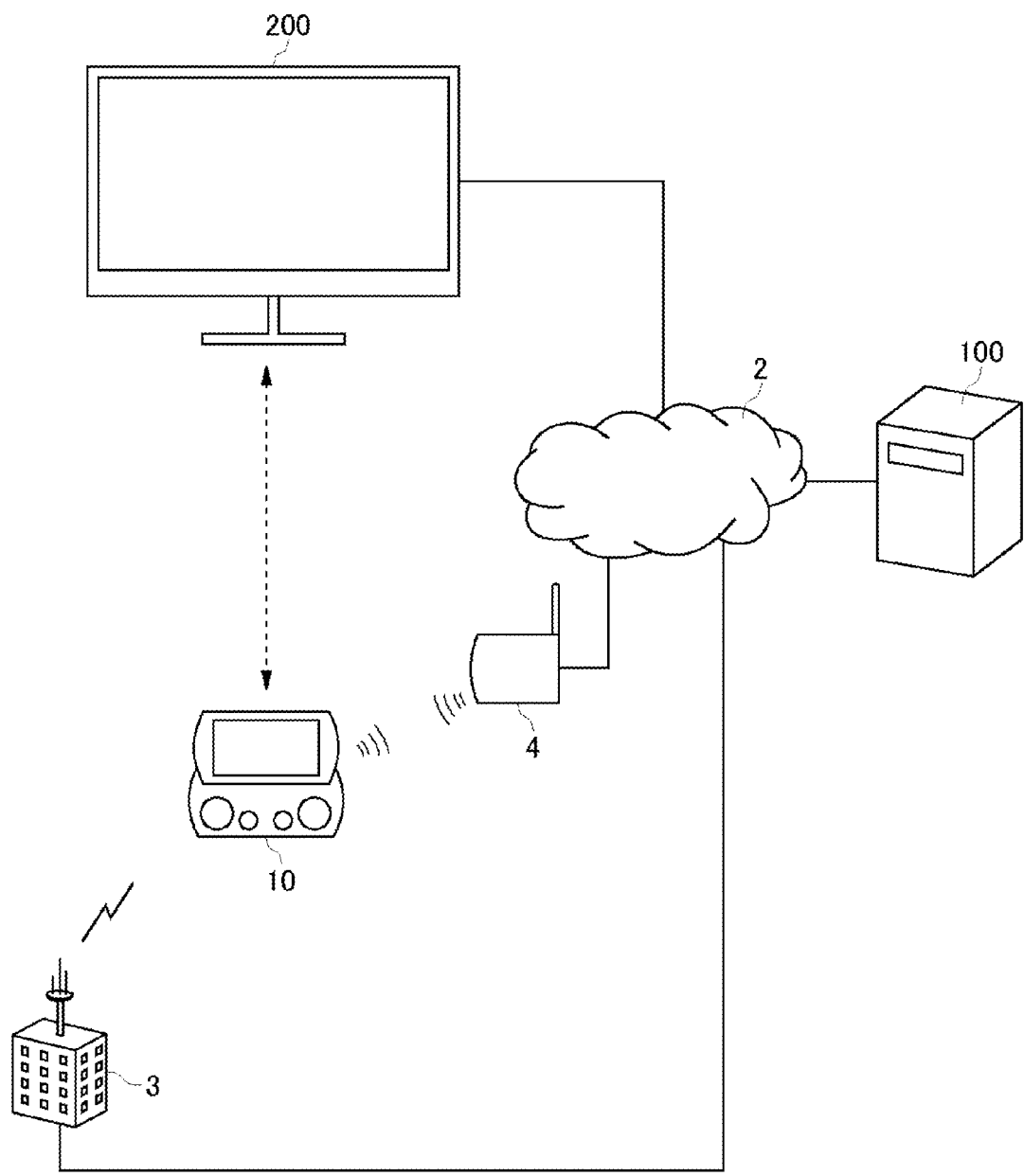
FIG. 1 is a diagram which shows a configuration of a user support system according to an embodiment.

FIG. 1 is a schematic diagram which shows a configuration of a user support system 1 according to an embodiment. The user support system 1 includes a management server 100, a portable information terminal 10, and a TV apparatus 200, which is an example of an apparatus to be controlled. The management server 100, the portable information terminal 10, and the TV apparatus 200 are connected via the Internet 2, which is an example of a network, such that they can communicate with each other.

The portable information terminal 10 is configured to perform processing of programs and data stored on a recording medium such as a mounted memory card or the like, and perform processing of programs and data acquired by communicating with an external device such as a server or the like. Examples of such programs and data to be processed include game programs, image data, and audio data. The portable information terminal 10 is configured to perform wireless communication between itself and an access point 4 by means of a wireless communication control unit 67 described later, and to be connected to the Internet 2 via the access point 4. Similarly, the portable information terminal 10 is configured to perform wireless communication between itself and the cellular phone network 3 by means of a cellular phone network communication control unit 69 described later, and to be connected to the Internet 2 via the cellular phone network 3. The TV apparatus 200 allows the user to receive a TV broadcasting service.

Upon receiving a request from the user of the portable information terminal 10, the management server 100 is configured to transmit a control program to the portable information terminal 10 so as to allow the user to remotely control an apparatus to be controlled, such as the TV apparatus 200 or the like, via the portable information terminal 10. In this stage, the management server 100 is configured to acquire the user's operation history for the TV apparatus 200, to estimate the skill level of the user based upon the operation history, and to transmit a control program having a user interface that matches the user's skill level. Thus, such an arrangement allows the user to receive a control program which will be easy for the user to use. Furthermore, such an arrangement provides an environment in which the user can remotely control various kinds of consumer electronics devices possessed by the user using the portable information terminal 10 via infrared communication or the like, thereby contributing to the promotion of distribution of such a portable information terminal 10.

First, description will be made below regarding an external configuration and a circuit configuration of the portable information terminal 10. Next, description will be made regarding a functional configuration of the portable information terminal 10 configured to provide a user support method according to the present embodiment, and detailed description will be made regarding the operation of each functional component. Furthermore, description will be made regarding a circuit configuration of the TV apparatus 200. Next, description will be made regarding a functional configuration of the TV apparatus 200 configured to provide the user support method according to the present embodiment, and detailed description will be made regarding the operation of each functional component. Moreover, description will be made regarding a circuit configuration of the management server 100. Next, description will be made regarding a functional configuration of the management server 100 configured to provide the user support method according to the present embodiment, and detailed description will be made regarding the operation of each functional component. Lastly, detailed description will be made with reference to a sequence diagram regarding the user support method employed in the user support system 1.

[External Configuration of the Portable Information Terminal]

Figure 2A:
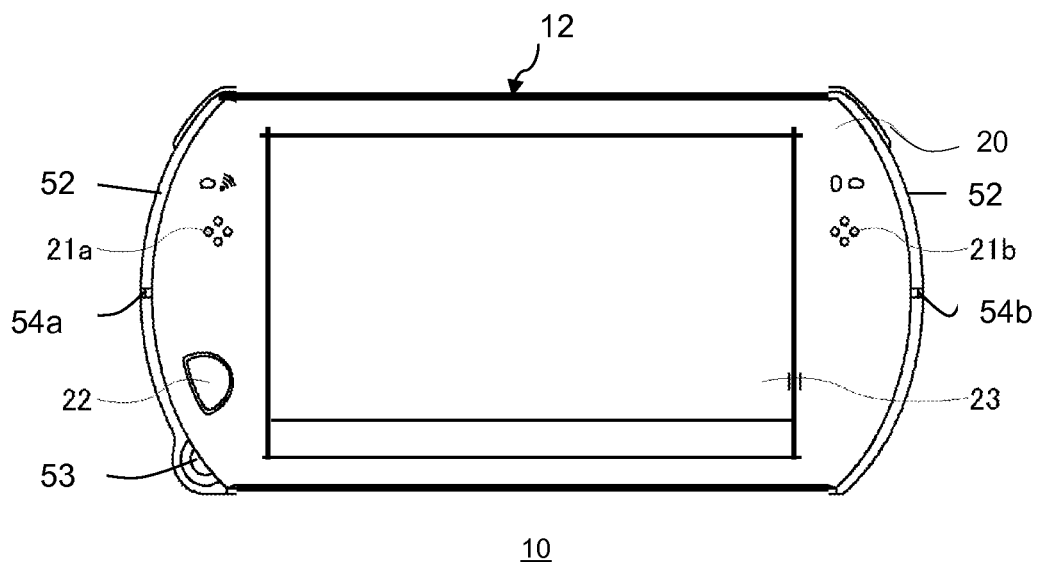
FIG. 2A is a front view showing a portable information terminal in the closed state according to the embodiment.
Figure 2B:
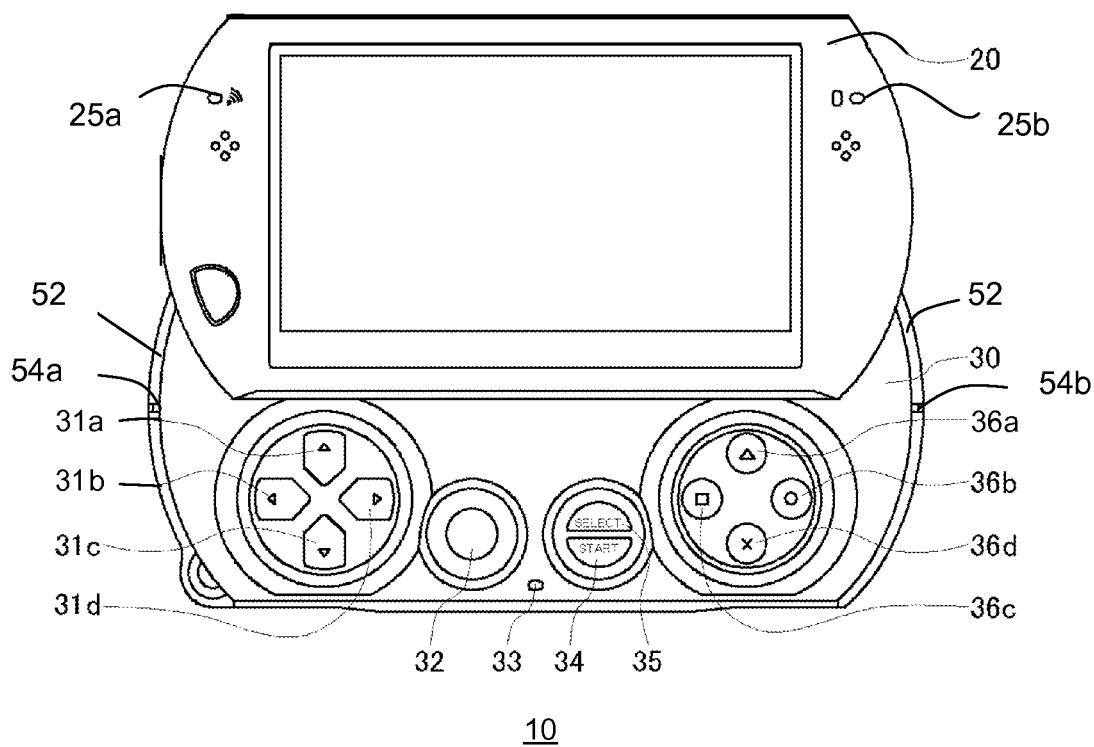
FIG. 2B is a front view showing the portable information terminal in the open state according to the embodiment.

FIGS. 2A and 2B show an external configuration of the portable information terminal 10 according to the present embodiment. The portable information terminal 10 includes a casing 12 and a terminal main unit 13 (not shown) housed in the casing 12 and configured to execute the aforementioned processing. The casing 12 includes an upper casing 20 positioned on the near side (front face side) from the point of view of the user who holds the portable information terminal 10, and a lower casing 30 positioned on the rear face side of the upper casing 20. The upper casing 20 and the lower casing 30 are each configured having an elliptical shape obtained by extending a rectangle having long sides along the horizontal direction (horizontal direction in FIGS. 2A and 2B) so as to form arc-shaped protuberances at both the left and right ends as viewed from the front face side (the side corresponding to the user). The upper casing 20 is configured to have a size that is slightly greater than that of the lower casing 30.

The lower casing 30 includes a metal frame member 52 configured to cover the outer edge of the upper casing 20. The size of the lower casing 30 is greater than that of the upper casing 20 to an extent that is equal to the size of the frame member 52. The upper casing 20 and the lower casing 30 are each formed in an approximately flat shape, and are configured such that one casing can be slid with respect to the other casing. It should be noted that description will be made in the present embodiment regarding an arrangement in which the upper casing 20 and the lower casing 30 are each formed of synthetic resin. Also, these casings 20 and 30 may be formed of metal.

FIG. 2A is a front view of the portable information terminal 10 when it is in the closed state. FIG. 2B is a front view of the portable information terminal 10 when it is in the open state. In the closed state of the portable information terminal 10, the upper casing 20 is positioned above the lower casing 30 such that the upper casing almost completely covers the lower casing 30. In this state, operation keys provided on the front face of the lower casing 30 are not exposed to the outside. By sliding the lower casing 30 with respect to the lower casing 20 in the closed state, such an arrangement allows the user to switch the portable information terminal 10 to the open state in which the operation keys provided on the front face of the lower casing 30 are exposed to the outside.

[Configuration of Front Part]

A display 23 is provided in approximately the central area of the upper casing 20. The display 23 is housed in the upper casing 20, and has a structure in which a transparent touch panel is stacked on a liquid crystal display panel. A translucent member 24 is provided on the area of the upper casing 20 that corresponds to the display 23. Such an arrangement allows the user to view an image displayed on the display 23 via the translucent member 24. It should be noted that the display 23 may include other kinds of display devices such as an organic EL (Electro-Luminescent) panel or the like, instead of the liquid crystal display panel.

Audio output openings 21a and 21b, which form a pair of audio output openings, are respectively provided on the left and right sides of the translucent member 24 so as to output sound output from a speaker (not shown) housed within the upper casing 20. Furthermore, indicators 25a and 25b are respectively provided to the left side and the right side above the audio output openings 21a and 21b. The left-side indicator 25a indicates the communication state provided by a wireless module described later. The right-side indicator 25b indicates the communication state provided by Bluetooth (trademark). The indicators 25a and 25b are each configured as an LED (Light Emitting Diode). A button 22 is provided below the left-side audio output opening 21a on the left side of the front part of the upper casing 20. The button 22 is configured such that it can be pressed in the depth direction. The button 22 is assigned to a function of switching the program which is currently executed, a function of ending a game, a function of temporarily suspending a game, or the like. A front-face camera 68a, as shown in FIGS. 14-16, is provided above the indicator 25b on the right side of the front face part of the upper casing 20. Similarly, a rear-face camera 68b (not shown) is provided in the central area along the horizontal direction on the rear face part of the lower casing 30.

As shown in FIG. 2B, the area which is exposed when the upper casing 20 is slid upward with respect to the lower casing 30 includes direction keys 31a, 31b, 31c, and 31d (which will be collectively referred to as the "direction keys 31") on the left side such that they allow the user to input a direction instruction from among eight directions, i.e., the upper direction, lower direction, left direction, right direction, and four oblique directions, and four buttons 36a, 36b, 36c, and 36d (which will be collectively referred to as the "buttons 36") on the right side such that they are positioned at apexes of a diamond shape. Furthermore, an analog pad 32 is arranged on the left side between the direction keys 31 and the buttons 36, and is configured to detect friction applied along the front part, and to detect the direction of the friction thus applied. Moreover, a start button 34 and a select button 35 are arranged on the right side in the form of a pair of semicircular buttons including the start button 34 and the select button 35 arranged in parallel along the vertical direction. A microphone 33 is arranged between the analog pad 32 and the area where the start button 34 and the select button 35 are arranged. After the portable information terminal 10 is set to the open state, such an arrangement allows the user to operate such operation keys.

A strap attachment opening 53 is formed in the left corner of the lower casing 30, which allows the user to attach a strap (not shown). The strap attachment opening 53 is formed in the aforementioned frame member 52. Furthermore, indicators 54a and 54b, which form a pair of indicators, are respectively formed on the left edge and the right edge in an approximately central area along the vertical direction on the front face part of the lower casing 30. The left-side indicator 54a is configured to indicate the readout/recording state of data from/into a memory card (not shown) mounted on the terminal main unit 13 via the media card slot 41. The right-side indicator 54b is configured to indicate the on/off state of a power supply for the portable information terminal 10. The indicators 54a and 54b are each configured as an LED. As shown in FIGS. 2A and 2B, the indicators 54a and 54b are arranged at positions such that they are not covered by the upper casing 20, thereby allowing the user to check the on/off state of the indicators 54a and 54b even if the lower casing 30 is covered by the upper casing 20.

[Configuration of Upper Face Part]

Figure 3A:
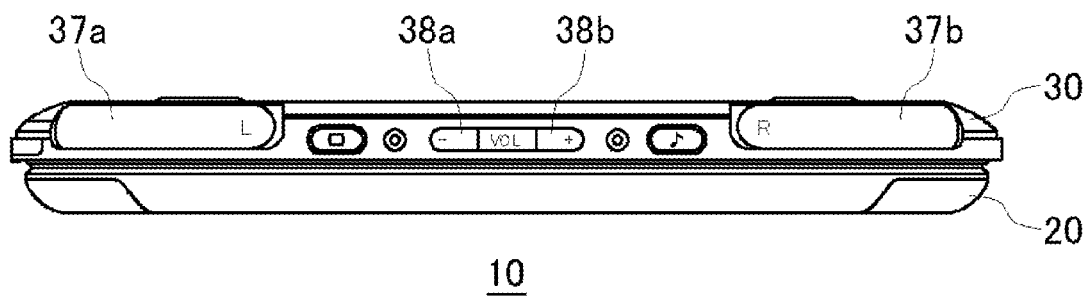
FIG. 3A is a view showing the upper face of the portable information terminal according to the embodiment, and FIG.

FIG. 3A shows the upper face of the portable information terminal 10. A left button 37a and a right button 37b, which form a pair of buttons, are arranged on both ends along the horizontal direction. The button arranged on the left side of the upper face part will be referred to as the "left button 37a", and the button arranged on the right side thereof will be referred to as the "right button 37b". The left button 37a and the right button 37b are each configured in an approximately L shape such that one side of the L-shaped button 37 extends along the upper face part and the other side thereof extends along the corresponding left side face part or otherwise right side face part. That is to say, the left button 37a and the right button 37b are arranged such that they each extend over the upper face part and the corresponding left face part or otherwise right face part. Volume buttons 38a and 38b, which form a pair of buttons, are arranged in an approximately central area on the upper face part, which allows the user to adjust the volume of sound out from the speaker.

[Configuration of Lower Face Part]

Figure 3B:
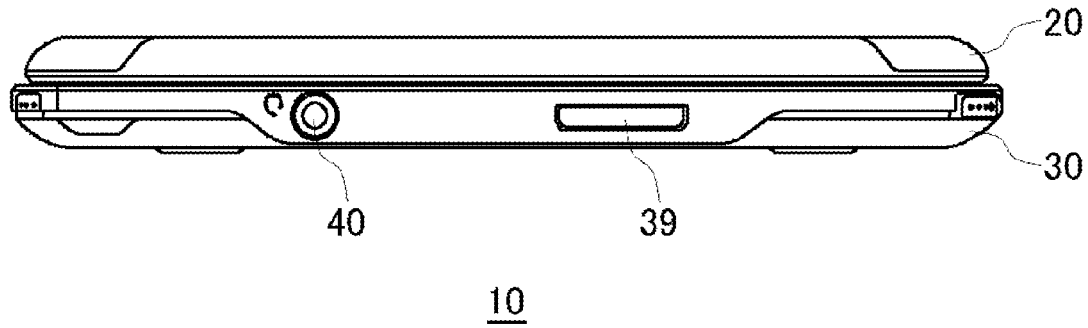

FIG. 3B shows the lower face of the portable information terminal 10. A stereo input/output terminal 40 is arranged on the left side of the lower face part of the lower casing 30, which allows the user to connect a headphone to the portable information terminal 10. Furthermore, a connection terminal 39 is arranged on the right side thereof, which allows the user to connect the portable information terminal 10 to a cradle (not shown) configured as an external device.

[Configuration of Left Side Face Part]

FIG. 4A shows the left side face of the portable information terminal 10. The upper end of the left side face part of the lower casing 30 is covered by a part of the left button 37a. The media card slot 41 is arranged on the upper side of the left side face part, which allows the user to detachably insert a memory card. A cover is arranged such that it covers the insertion opening of the media card slot 41. A key 42 is arranged on the lower side of the left side face part, and is configured such that it is slidable along the left side face part. The key 42 is configured to allow the user to switch the on/off state of the wireless module.

[Configuration of Right Side Face Part]

FIG. 4B shows the right side face of the portable information terminal 10. The upper end of the right side face part of the lower casing 30 is covered by a part of the right button 37b, as with the left side face part. A power supply/hold switch 50 is arranged on the lower side of the right side face part, and is configured such that it is slidable along the right side face part. When the user slides the power supply/hold switch 50 upward, the power supply for the portable information terminal 10 is turned on. When the user again slides the power supply/hold switch 50 upward, the power supply for the portable information terminal 10 is turned off. When the user slides the power supply/hold switch 50 downward, the portable information terminal 10 is switched to a hold state in which the input operations of other keys are canceled. When the portable information terminal 10 is in the closed state, the operation keys arranged on the front face of the lower casing 30 are not exposed to the outside. In contrast, the button 22, the left button 37a, and the right button 37b are always exposed to the outside. Thus, when the user desires to suspend use of the portable information terminal 10, by sliding the power supply/hold switch 50 downward, such an arrangement allows the key operations of the button 22, the left button 37a, and the right button 37b to be disabled, thereby avoiding unintended accidental operation of the operation keys.

[Circuit Configuration of Portable Information Terminal 10]

FIG. 5 shows a circuit configuration of the portable information terminal 10. A display apparatus 60 is configured to display a display screen generated by means of respective functions of the portable information terminal 10. The display apparatus 60 may be configured as a liquid crystal display apparatus, or may be configured as an organic EL display apparatus, as described above. A touch panel 61 is arranged on the display device 60 such that they are stacked, and is configured to detect being touched by the user's finger or otherwise by a pen. The touch panel 61 may be configured using various kinds of methods such as a resistive touch panel method, a surface capacitive touch panel method, a projected capacitive touch panel method, and so forth. As described above, the display 23 comprises the display apparatus 60 and the touch panel 61.

LEDs 62 are configured as the aforementioned indicators 25a, 25b, 54a, and 54b. A motion sensor 63 is configured to detect the motion of the portable information terminal 10. A microphone 33 is configured to input sound around the portable information terminal 10. A speaker 64 is configured to output sound generated by means of respective functions of the portable information terminal 10. The stereo input/output terminal 40 is configured to receive stereo sound as an input signal via an external microphone, and to output stereo sound to an external headphone or the like. An input device 65 includes the aforementioned operation keys and so forth, and is configured to receive operations input by the user. The touch panel 61, the LEDs 62, the motion sensor 63, the microphone 33, the speaker 64, the stereo input/output terminal 40, and the input device 65, described above, are configured to mutually transmit/receive data to/from a CPU 71 or the like via an interface 66.

The wireless communication control unit 67 is configured using a wireless LAN (Wireless Local Area Network) that conforms to a communication standard such as IEEE 802.11b/g or the like, and is configured to wirelessly communicate with the access point 4 or the like, and to control the communication between the portable information terminal 10 and the management server 100 via the access point 4 and the Internet 2, as shown in FIG. 1. A camera 68 is configured to acquire an image, and to input the image data thus acquired. A cellular phone network control unit 69 is configured to be compatible with the third generation digital cellular phone method that conforms to the IMT-2000 standard stipulated by the ITU (International Telecommunication Union). As shown in FIG. 1, the cellular phone network control unit 69 is configured to control communication between the portable information terminal 10 and the management server 100 via the cellular phone network 3 and the Internet 2. A SIM card 70 stores ID numbers uniquely assigned for cellular phone number identification. After the SIM card 70 is inserted into the portable information terminal 10, such an arrangement allows the portable information terminal 10 to perform communication via the cellular phone network. The camera 68 is configured as a front-face camera 68a and a rear-face camera 68b each configured as a CMOS image sensor (Complementary Metal Oxide Semiconductor Image Sensor). The front-face camera 68a and the rear-face camera 68b are configured to acquire images toward the front side and the rear side, respectively, and to output the images thus acquired in the form of image data.

The CPU (Central Processing Unit) 71 is configured to execute a program or the like loaded into main memory 73, thereby providing the respective functional components shown in FIG. 6. A GPU (Graphics Processing Unit) 72 is configured to execute calculation required for image processing. The main memory 73 is configured as RAM (Random Access Memory) or the like, and is configured to store programs and data to be executed on the portable information terminal 10. Storage 74 is configured as NAND-type flash memory or the like, and is configured to store programs, data, and so forth, which are to be used by each component of the portable information terminal 10.

A GPS (Global Positioning System) control unit 75 is configured to receive a signal from GPS satellites, and to calculate the current position. A Bluetooth control unit 76 is configured to control wireless communication between the portable information terminal 10 and a peripheral apparatus 15 via a Bluetooth interface. A USB control unit 77 is configured to control communication between the portable information terminal 10 and the peripheral apparatus 15 via a USB interface. A memory card control unit 78 is configured to control reading/writing of data from/to an external medium 16. A video output control unit 79 is configured to output a video signal to an external display device 17 according to a standard such as HDMI. An infrared communication control unit 59 is configured to control infrared communication between the portable information terminal 10 and the TV apparatus 200.

[Computer Architecture of Portable Information Terminal 10]

FIG. 6 shows a schematic configuration of a computer architecture of the portable information terminal 10 according to the present embodiment. With the portable information terminal 10, an operating system (OS) 6 is installed on hardware 5 such as the CPU 71, main memory 73, or the like, and a game library 7a is prepared which is configured to operate a game application 8a. The portable information terminal 10 is configured to establish a virtual home electronics device control machine 7b in order to operate a consumer electronics device control application 8b. In this state, such an arrangement emulates an environment for operating the consumer electronics device application 8b. Thus, the management server 100 is not required to prepare a dedicated control program for each kind of hardware. Such a platform may be established using Android or the like. Here, Android is a software development/execution environment for cellular phone terminals offered by Google, Inc. in November 2007. Google, Inc. has established an industry group, i.e., the Open Handset Alliance (OHA), in cooperation with several tens of companies such as cellular phone companies and terminal companies around the world, which is promoting development and distribution of the related art. Android provides a set consisting of an OS, middleware, user interface, and so forth, which can operate on a cellular phone terminal in a software development/execution environment based on Linux, which is an open source OS. Such a system allows the developer to freely develop application software, and to operate the application software on a terminal that conforms to Android, after the application software is downloaded to this terminal.

[Functional Configuration of Portable Information Terminal 10]

FIG. 7 shows a functional configuration of the portable information terminal 10 according to the present embodiment. FIG. 7 shows the functional components configured to provide the user support method according to the present embodiment, and the other components are not shown. In FIG. 7, each component represented as a functional block configured to perform various kinds of processing may be realized by means of hardware devices such the CPU 71, the main memory 73, and other LSIs, or may be realized by means of software components such as a program or the like loaded into the main memory 73. Such functional blocks can be realized by hardware components alone, software components alone, or various combinations thereof, which can be readily conceived by those skilled in this art. That is to say, such functional blocks are by no means restricted to any one of the aforementioned configurations.

The portable information terminal 10 includes a control unit 80, a history storing unit 92, and a control program storing unit 93. The control unit 80 is configured mainly as the CPU 71. The history storing unit 92 and the control program storing unit 93 are each configured mainly as the main memory 73 or otherwise as the storage 74. The control unit 80 includes a control program request unit 81, a device information acquisition unit 82, a control program acquisition unit 83, a control program executing unit 84, a history recording unit 85, a history transmitting unit 86, and a version checking unit 87.

Upon receiving an instruction from the user to install, on the portable information terminal 10, a control program for remotely controlling the TV apparatus 200 to be controlled, the control program request unit 81 is configured to request the management server 100 to download the control program. In this stage, the device information acquisition unit 82 is configured to acquire the device information with respect to the TV apparatus 200 from the TV apparatus 200 via the infrared communication control unit 59. The control program request unit 81 is configured to notify the management server 100 of the device information with respect to the TV apparatus 200 thus acquired by the device information acquisition unit 82, and to request the management server 100 to download the control program for remotely controlling the TV apparatus 200. The control program acquisition unit 83 is configured to acquire the control program from the management server 100, and to instruct the control program storing unit 93 to store the control program.

Before the user remotely controls the TV apparatus 200, the control program executing unit 84 is configured to read out the control program for controlling the TV apparatus 200 from the control program storing unit 93, and to execute the control program thus read out. The control signal for controlling the TV apparatus 200 may be transmitted via the infrared communication control unit 59 or otherwise the wireless communication control unit 67. The history recording unit 85 is configured to instruct the history recording unit 92 to record the user's operation history for the control program. The history transmitting unit 86 is configured to read out the user's operation history from the history storing unit 92, and to transmit the user's operation history thus read out to the management server 100. The version checking unit 87 is configured to request the management server 100 to check the version of a control program held by the control program storing unit 93. When the management server 100 stores an updated version of the control program, the version checking unit 87 is configured to instruct the control program acquisition unit 83 to download the updated version of the control program.

The history information is used by the management server 100 to judge what kind of control program is to be transmitted to the portable information terminal 10, as described later. The history transmitting unit 86 may be configured to transmit the history information to the management server 100 when the control program executing unit 84 starts to execute a control program. Also, the history transmitting unit 86 may be configured to transmit the history information to the management server 100 when the control program executing unit 84 ends execution of the control program. Also, the history transmitting unit 86 may be configured to transmit the history information to the management server 100 when the version checking unit 87 requests the management server 100 to check the version of a control program. Also, the history transmitting unit 86 may be configured to acquire the user's operation history for the TV apparatus 200 from the TV apparatus 200, and to transmit the user's operation history thus acquired to the management server 100.

[Circuit Configuration of TV Apparatus 200]

FIG. 8 shows a circuit configuration of the TV apparatus 200. The TV apparatus 200 mainly includes a communication control unit 111, a control unit 212, an operation unit 213, a TV signal receiving unit 214, a video signal processing unit 215, an audio signal processing unit 216, an input interface 217, an infrared communication control unit 218, a liquid crystal panel 219, and a speaker 220. Such components are electrically connected via a bus 21.

The communication control unit 111 is configured to control communication between the TV apparatus 200 and other devices via the Internet 2. The control unit 212 is configured as a CPU, memory, and so forth, and is configured to control other components of the TV apparatus 200. The TV signal receiving unit 214 is configured to perform channel selection according to an instruction from the control unit 212, to decode a TV signal received via an antenna 222 or the like so as to extract a video signal and an audio signal, and to output the video signal and the audio signal thus extracted. The video signal processing unit 215 is configured to perform necessary signal processing on the video signal, and to supply the video signal thus processed to the liquid crystal panel 219. Thus, an image is displayed on the liquid crystal panel 219. The audio signal processing unit 216 is configured to perform necessary signal processing and amplification processing on a sound signal so as to generate an audio signal, and to supply the audio signal thus processed to the speaker 220. Thus, sound is output from the speaker 220.

The operation unit 213 allows the user to perform various kinds of operations and to configure various kinds of settings for the TV apparatus 200 in order to receive a TV broadcasting service. For example, the operation unit 213 is configured to receive, from the input interface 217 or the infrared communication control unit 218, various kinds of control signals such as a control signal for channel selection, a control signal for volume adjustment, a control signal for input switching, and so forth, and to notify the control unit 212 of such signals. The input interface 114 includes buttons for channel selection, buttons for volume adjustment, and so forth, and is configured to transmit an instruction input by the user to the operation unit 213. The infrared communication control unit 218 is configured to receive a control signal output from a remote controller 224 or otherwise the portable information terminal 10, and to transmit the control signal thus received to the operation unit 213. Furthermore, the operation unit 213 is configured to receive a request from the portable information terminal 10 to transmit the device information with respect to the TV apparatus 200 itself, and to transmit the device information with respect to the TV apparatus 200 itself to the portable information terminal 10.

[Functional Configuration of TV Apparatus 200]

FIG. 9 shows a functional configuration of the TV apparatus 200. The TV apparatus 200 includes a control unit 280, a device information storing unit 292, and a history storing unit 293. The control unit 280 includes a device information transmitting unit 281, a history recording unit 282, and a history transmitting unit 283. Such functional blocks may be realized by hardware components alone, software components alone, or various combinations thereof.

Upon receiving a request from the portable information terminal 10 to transmit the device information with respect to the TV apparatus 200, the device information transmitting unit 281 is configured to read out the device information with respect to the TV apparatus 200 itself from the device information storing unit 292, and to transmit the device information thus read out to the portable information terminal 10. With the present embodiment, the device information is transmitted to the management server 100 via the portable information terminal 10. Also, the device information transmitting unit 281 may directly transmit the device information to the management server 100. The history recording unit 282 is configured to instruct the history storing unit 283 to record the user's operation history for the operation unit 213. The history transmitting unit 283 is configured to read out the user's operation history from the history storing unit 92, and to transmit the user's operation history thus read out to the management server 100. Upon receiving a request from the portable information terminal 10 to transmit the device information, the history transmitting unit 283 may be configured to transmit the operation history to the management server 100. Also, the history transmitting unit 283 may be configured to transmit the operation history to the management server 100 at a predetermined different timing. Also, an arrangement may be made in which the history transmitting unit 283 transmits the user's operation history to the portable information terminal 10, and the portable information terminal 10 transmits the user's operation history thus received to the management server 100.

[Circuit Configuration of Management Server 100]

FIG. 10 shows a circuit configuration of the management server 100. The management server 100 mainly includes a communication control unit 111, a CPU 112, main memory 113, an input interface 114, a display interface 115, and storage 116. Such components are electrically connected via a bus 117.

The communication control unit 111 is configured to control communication between the management server 100 and other apparatuses via the Internet 2. The CPU 112 is configured to execute a program or the like loaded into the main memory 113, thereby providing each functional component shown in FIG. 11. The main memory 113 is configured as RAM or the like, and is configured to store programs or data to be executed on the management server 100. The input interface 114 is configured to receive, as an input signal, an external signal to be input to other components from an external circuit. The display interface 115 is configured to output, to an external circuit, a display signal generated by means of a program or the like executed on the CPU 112. The storage 116 is configured as an HDD or the like, and is configured to record programs, data, and so forth, used by each component of the management server 100.

[Functional Configuration of Management Server 100]

FIG. 11 shows a functional configuration of the management server 100. The management server 100 includes a control unit 180, a control program database 192, a user database 193, and a control program storing unit 194. The control unit 180 includes a control program request receiving unit 181, a device information acquisition unit 182, a history acquisition unit 183, a version management unit 184, a control program judgment unit 185, and a control program transmitting unit 186. Such functional blocks can also be realized by hardware components alone, software components alone, or various combinations thereof.

FIG. 12 shows an example of an internal data structure of the control program database 192. The control program database 192 includes a model number field 130, a control program ID field 131, a latest version field 132, a number-of-types field 133, and a condition field 134. The model number field 130 stores the model number of the apparatus to be controlled by means of the control program. The control program ID field 131 stores the ID of the control program for remotely controlling the apparatus with the model number stored in the model number field 130. The latest version field 132 stores the latest version number of each control program stored in the control program storing unit 194. The number-of-types field 133 stores the number of types of control programs that are respectively prepared for the respective user skill levels. For example, as the control program for remotely controlling the apparatus with the model number "0001", three types of control programs, i.e., a beginner-level control program, an intermediate-level control program, and an advanced-level control program, are prepared.

The condition field 134 stores the conditions for judging the control program type. For example, the condition field 134 stores conditions with respect to the user's operation history, which is used to judge whether or not the control program to be supplied is to be switched from the beginner-level control program, i.e., the type 1 control program, to the intermediate-level control program, i.e., the type 2 control program. Examples of such conditions with respect to the user's operation history include: the number of times the user has operated the apparatus; the number of times the user has used a particular function, the number of times the user has changed the settings of the apparatus; the time elapsed since the user downloaded the control program; the user's skill level for the apparatus to be controlled; and so forth.

FIG. 13 shows an example of an internal data structure of the user database 193. The user database 193 includes a user ID field 140, a model number field 141, a control program ID field 142, a type field 143, a version field 144, a history field 145, a skill level field 146, and a type specification field 147. The user ID field 140 stores user IDs. The model number field 141 stores the model number of each apparatus to be controlled by the user. The control program ID field 142 stores the ID of the control program distributed to the user. The type field 143 stores the control program type distributed to the user. Here, a single control program may contain all control program types. In this case, the type field 143 stores the control program type to be provided when the control program is started up. The version field 144 stores the version of the control program distributed to the user. The history field 145 stores the user's operation history with respect to the apparatus to be controlled, which is acquired from the apparatus to be controlled by the user, or otherwise from the portable information terminal 10. In the example shown in FIG. 13, as the user's operation history for the TV apparatus 200, the history field 145 stores: the number of times the user has operated the TV apparatus 200; the number of times the user has changed settings of the TV apparatus 200; and the number of times the user has used the EPG function. The history field 145 stores information required to judge the conditions stored in the condition field 134 of the control program database 192 for each type of the apparatus to be controlled. Also, the history field 145 may store the user's operation history as it is without processing the user's operations. The skill level field 146 stores the user's skill level with respect to the user's operation for the apparatus to be controlled. The type specification field 147 stores the type specified by the user when the user desires to continuously use a certain control program type. In a case in which there are multiple apparatuses to be controlled by the user, the number of model number fields 141, the number of control program ID fields 142, the number of type fields 143, the number of version fields 144, the number of history fields 145, the number of skill level fields 146, and the number of type specification fields 147, which are to be provided, match the number of the apparatuses to be controlled.

The control program request receiving unit 181 is configured to receive, from the portable information terminal 10, a request for a control program for remotely controlling the apparatus to be controlled. The control program request receiving unit 181 is configured to receive authentication information such as the user ID and password set for the portable information terminal 10, and to authenticate the user with reference to authentication information (not shown) stored in the user database 193 or the like. If the user has not yet been registered in the user database 193, the control program request receiving unit 181 is configured to receive the user's information, and to register the user in the user database 193.

The device information acquisition unit 182 is configured to receive device information with respect to the apparatus to be controlled. The device information acquisition unit 182 may receive the device information from the TV apparatus 200 which is an apparatus to be controlled, or otherwise may receive the device information from the portable information terminal 10 after it acquires the device information from the TV apparatus 200. The device information acquisition unit 182 is configured to register the device information with respect to the TV apparatus 200 in the user database 193 with the device information associated with the user ID of the TV apparatus 200 or otherwise the portable information terminal 10. Description will be made in the present embodiment regarding an arrangement in which the model number of the TV apparatus 200 is registered in the model number field 141 of the user database 193.

The history acquisition unit 183 is configured to acquire the user's operation history for the apparatus to be controlled, and to record the user's operation history in the user database 193. The history acquisition unit 183 may acquire the user's operation history from the TV apparatus 200, or may acquire the operation history from the portable information terminal 10. In the latter case, the history acquisition unit 183 may acquire the operation history performed according to the control program installed on the portable information terminal 10. Also, the history acquisition unit 183 may acquire the operation history acquired by the portable information terminal 10 from the TV apparatus 200, in addition to the operation history performed according to the control program installed on the portable information terminal 10.

The version management unit 184 is configured to check whether or not the version of a control program distributed to the portable information terminal 10 is the latest-version control program stored in the control program storing unit 194. The version management unit 184 is configured to compare the latest version field 132 of the control program database 192 with the version field 144 of the user database 193, and to instruct the control program transmitting unit 186 to transmit the latest-version control program when the version of the control program distributed to the portable information terminal 10 does not match the latest version. The version management unit 184 may be configured to check the control program used by the user at a predetermined timing, and to notify the portable information terminal 10 when the latest-version control program is updated. Also, the version management unit 184 may be configured to check the control program used by the user upon receiving a request to check the version of the control program from the portable information terminal 10.

The control program judgment unit 185 is configured to judge the user's skill level based upon the user's operation history for the apparatus to be controlled, to register the user's skill level thus judged in the skill level field 146 of the user database 193, and to judge the control program type to be transmitted to the portable information terminal 10. The control program judgment unit 185 judges whether or not the user's operation history satisfies the conditions with reference to the history field 145 of the user database 193 and the condition field 134 of the control program database 192, so as to judge the control program type to be transmitted. The control program transmitting unit 186 is configured to read out the control program of the type thus judged from the control program storing unit 194, and to transmit the control program thus read out to the portable information terminal 10.

FIG. 14 shows an example of a screen displayed on the display 23 by means of the beginner-level control program. Such an arrangement displays, on the screen, a button which allows the user to switch the input channel of the TV apparatus 200, a button which allows the user to adjust the volume, a channel switching button which allows the user to switch the channel, and a button which allows the user to turn on and off the power supply. That is to say, such an arrangement displays only the minimum kinds of buttons necessary for operating the TV apparatus 200. By operating the direction keys 31a and 31c, the buttons 36a and 36d, or the like, arranged on the portable information terminal 10, such an arrangement allows the user to transmit an instruction to the TV apparatus 200. Also, by touching the position that corresponds to each button on the touch panel 61, such an arrangement allows the user to transmit an instruction to the TV apparatus 200.

A button 57 is arranged on the screen in order to allow the user to switch the control program to the higher-level control program type. By operating the button 57, such an arrangement allows the user to switch the beginner-level control program to the intermediate-level control program. Upon receiving an operation of the button 57, the control program executing unit 84 is configured to read out the intermediate-level control program from the control program storing unit 93, and to execute the control program thus read out. If the intermediate-level control program is not stored in the control program storing unit 93, the control program executing unit 84 is configured to instruct the control program acquisition unit 83 to acquire the control program from the management server 100.

FIG. 15 shows an example of a screen displayed by means of the intermediate-level control program. On the screen, such an arrangement displays a button which allows the user to switch the input channel to the digital terrestrial broadcasting service, a button which allows the user to switch the input channel to the BS broadcasting service or otherwise the CS broadcasting service, and channel number buttons, in addition to the buttons displayed according to the beginner-level control program. That is to say, the number of buttons displayed according to the intermediate-level control program is greater than the number of buttons displayed according to the beginner-level control program, which is convenient for a user who has become accustomed to the operation of the TV apparatus 200. Furthermore, on the screen, such an arrangement displays a button 57 which allows the user to switch the control program to a higher-level control program, and a button 58 which allows the user to switch the control program to a lower-level control program.

FIG. 16 shows an example of a screen displayed on the display 23 by means of the advanced-level control program. On the screen, an electronic program guide (EPG) is displayed. For users who have mastered such an electronic program guide, such an arrangement provides a user interface which allows the user to operate the electronic program guide. On the screen, a button 58 is arranged so as to allow the user to switch the control program to a lower-level control program.

The control program judgment unit 185 is configured to check the version of a control program that has already been transmitted to the portable information terminal 10. Furthermore, when the latest-version control program is to be transmitted, the control program judgment unit 185 again judges the control program type to be transmitted to the portable information terminal 10, based upon the user's operation history. In this stage, the control program judgment unit 185 may judge the control program type to be transmitted to the portable information terminal 10 based upon the operation history for the buttons 57 and 58 which allow the user to input an instruction to switch the control program type to a different type. For example, in a case in which a user to whom the intermediate-level control program has been transmitted has operated the button 58, which allows the user to switch the control program to the beginner-level control program, a predetermined number of times or more, the management server 100 may transmit the beginner-level control program. Conversely, in a case in which a user to whom the intermediate-level control program has been transmitted has operated the button 57, which allows the user to switch the control program to the advanced-level control program, a predetermined number of times or more, the management server 100 may transmit the advanced-level control program.

Also, the control program judgment unit 185 may judge the control program type to be transmitted based upon the number of times the user has operated a user interface such as buttons and so forth provided for each control program type. When a user has operated a particular user interface provided to only a given control program type a predetermined number of times or more, the control program judgment unit 185 may judge that this control program type is to be transmitted to the user. For example, in a case in which a user has operated an electronic program guide many times, the management server 100 may transmit the advanced-level control program shown in FIG. 16 to the user. Conversely, when a user has operated a particular user interface provided to only a given control program type a predetermined number of times or less, the control program judgment unit 185 may judge that the management server 100 should transmit to the user a lower-level control program than this control program type. For example, in a case in which a user to whom the intermediate-level control program has been transmitted has rarely operated the channel buttons, and has mainly operated the same channel switching buttons as those provided by the beginner-level control program, the management server 100 may transmit the beginner-level control program to the user.

The control program judgment unit 185 may judge that the management server 100 should transmit, as a high-priority control program, the control program type according to the desire of the user with reference to the type specification field 147 of the user database 193. For example, in some cases, the user desires to switch the channel while viewing the electronic program guide even if the user perform almost no operations except for operating the channel switching buttons. In this case, if the management server 100 transmits the beginner-level control program to such a user based upon the fact that the user has operated only the channel switching buttons without involving the channel switching function executed in the electronic program guide, it would be the opposite of the user's wishes. Thus, when the user designates a particular control program type, the management server 100 transmits the control program of the type designated by the user regardless of the judgment result obtained with reference to the condition field 134 of the control program database 192.

[Procedure of the User Support Method]

FIG. 17 is a sequence diagram which shows the procedure of the user support method according to the present embodiment. In the sequence diagrams shown in FIG. 17 and other drawings, each step of each operation will be indicated by a combination of "S" (which is the initial letter of "Step") which represents "Step" and a number. With such an arrangement, when the judgment result is "true" in a given judgment step represented by a combination of "S" and a number, the judgment result is represented by the addition of "Y" (which is the initial letter of "Yes"). In this case, the judgment result is represented by "Y in S10", for example. Conversely, when the judgment result is "false", the judgment result is represented by the addition of "N" (which is the initial letter of "No"). In this case, the judgment result is represented by "N in S10", for example. First, upon receiving an instruction from the user to acquire the control program, the device information acquisition unit 82 of the portable information terminal 10 requests the TV apparatus 200 to transmit the device information (S110). The device information transmitting unit 281 of the TV apparatus 200 transmits the device information to the portable information terminal 10 (S112). The history transmitting unit 283 of the TV apparatus 200 transmits the user's operation history stored in the history storing unit 293 to the management server 100 (S120).

The control program request unit 81 of the portable information terminal 10 requests the management server 100 to transmit the control program (S130). In this stage, the control program request unit 81 transmits the device information with respect to the TV apparatus 200 to the management server 100 (S132). The control program request receiving unit 181 of the management server 100 is configured to identify the user of the portable information terminal 100 based upon the user ID, the device ID of the portable information terminal 10, or the like. The device information acquisition unit 182 of the management server 100 is configured to acquire the device information with respect to the TV apparatus 200 from the portable information terminal 10, and to register the device information thus acquired in the user database 193.

The control program judgment unit 185 of the management server 100 judges the user's skill level with reference to the history field 145 of the user database 193, and stores the user's skill level thus judged in the skill level field 146 of the user database 193 (S134). The control program judgment unit 185 of the management server 100 judges the control program type that matches the user's skill level with reference to the history field 145 and the skill level field 146 of the user database 193 and the condition field 134 of the control program database 192 (S136). The control program transmitting unit 186 of the management server 100 reads out the control program of the type thus judged from the control program storing unit 194, and transmits the control program thus read out to the portable information terminal 10 (S138). The control program acquisition unit 83 of the portable information terminal 10 stores the control program thus acquired in the control program storing unit 93. In subsequent operations, such an arrangement allows the user to operate the portable information terminal 10 so as to transmit a control signal to the TV apparatus 200, thereby allowing the user to remotely control the TV apparatus 200 (S140).

FIG. 18 is a sequence diagram which shows a procedure for managing the version of the control program using the user support method according to the present embodiment. When the version checking unit 87 of the portable information terminal 10 requests the management server 100 to check the version of a control program stored in the control program storing unit 93 (S160), the version management unit 184 of the management server 100 checks whether or not the latest-version control program stored in the control program storing unit 194 has already been transmitted to the portable information terminal 10 (S162). When judgment is made that the latest-version control program has already been transmitted to the portable information terminal 10 (Y in S164), the management server 100 notifies the portable information terminal 10 of this information. Conversely, when judgment is made that the latest-version control program has not yet been transmitted to the portable information terminal 10 (N in S164), the control program judgment unit 185 of the management server 100 again judges the user's skill level based upon the user's operation history (S168), and judges the control program type that matches the user's skill level (S170). The control program transmitting unit 186 of the management server 100 transmits the control program of the type thus judged to the portable information terminal 10 (S172). Thus, such an arrangement is capable of updating the control program stored in the portable information terminal to be the latest version, and is capable of switching the control program type such that it matches the user's skill level.

While description has been made regarding the present invention with reference to the embodiment, such description is for illustrative purposes only, and it is to be understood by those skilled in this art that changes and variations may be made without departing from the spirit or scope of the appended claims.

Description has been made in the embodiment regarding an arrangement in which the management server 100 transmits the control program to the portable information terminal 10. Also, an arrangement may be made in which an apparatus to be controlled transmits such a control program to the portable information terminal 10. In this case, an arrangement may be made in which the management server 100 transmits a control program of a type judged based upon the user's operation history to the apparatus to be controlled, and the apparatus to be controlled transmits the control program thus received to the portable information terminal 10. Also, an arrangement may be made in which the management server 100 transmits all the control program types to the apparatus to be controlled, and the apparatus to be controlled transmits the control program of the type judged based upon the user's operation history to the portable information terminal 10.

What is claimed is:

1. A management server comprising:
a control program storing unit configured to store a plurality of types of control programs that correspond to skill levels of a user of a portable information terminal with respect to an apparatus to be controlled, as control programs which allow the user to remotely control the apparatus to be controlled via the portable information terminal;
a control program request receiving unit configured to receive a request for the control program from the portable information terminal;
a device information acquisition unit configured to acquire device information with respect to the apparatus to be controlled;
a history acquisition unit configured to acquire a user's operation history for the apparatus to be controlled;
a control program judgment unit configured to judge, based upon the operation history, the user's skill level and a corresponding control program type to be transmitted to the portable information terminal;
a control program transmitting unit configured to read out the control program of the type thus judged from the control program storing unit, and to transmit the control program thus read out to the portable information terminal; and
a version management unit configured to check whether or not the version of a control program that has already been transmitted to the portable information terminal matches a most recent version of the control program stored in the control program storing unit, and to instruct the control program transmitting unit to transmit the most recent version of the control program to the portable information terminal when the version thus checked does not match the most recent version,
wherein, when the control program transmitting unit transmits the most recent version of the control program to the portable information terminal, the control program judgment unit is configured to again acquire the user's operation history for the apparatus to be controlled, and to judge, based upon the operation history, the control program type to be transmitted to the portable information terminal, and
wherein the control program judgment unit lowers the user's skill level when the operation history includes less than predetermined number of times operating one or more predetermined functions on the apparatus to be controlled.

2. A management server according to claim 1, wherein the control program comprises a user interface which allows the user to input an instruction to switch the control program to a different control program type, and wherein the control program judgment unit is configured to judge the control program type to be transmitted to the portable information terminal, based upon the operation history for the user interface.

3. A management server according to claim 1, further comprising a user database configured to store the control program type which the user desires to use as a high-priority control program type, wherein the control program judgment unit is configured to further judge the control program type to be transmitted to the portable information terminal, with reference to the user database.

4. A user support method comprising:

a control program request receiving apparatus included in a computer receiving, from a portable information terminal, a request for a control program which allows an apparatus to be remotely controlled via the portable information terminal;

a device information acquisition unit included in the computer acquiring device information with respect to the apparatus to be controlled;

a history acquisition unit included in the computer acquiring a user's operation history for the apparatus to be controlled;

a control program judgment unit included in the computer judging the user's skill level and a corresponding control program type, from plural control program types, to be transmitted to the portable information terminal, based upon the operation history;

a control program transmitting unit included in the computer transmitting a control program of the type thus judged to the portable information terminal;

a version management unit included in the computer checking whether or not the version of a control program that has already been transmitted to the portable information terminal matches a most recent version, and when the version thus checked does not match the most recent version, the version management unit instructing the control program transmitting unit to transmit the most recent version of the control program to the portable information terminal; and when the control program transmitting unit transmits the most recent version of the control program to the portable information terminal, the control program judgment unit again acquiring the user's operation history for the apparatus to be controlled, and judging, based upon the operation history thus acquired, the control program type to be transmitted to the portable information terminal, wherein the control program judgment unit lowers the user's skill level then the operation history includes less than a predetermined number of times operating one or more predetermined functions on the apparatus to be controlled.

5. A computer program stored in a non-transitory computer readable medium, comprising:

a module configured to provide a function for receiving, from a portable information terminal, a request for a control program which allows an apparatus to be remotely controlled via the portable information terminal;

a module configured to provide a function for acquiring device information with respect to the apparatus to be controlled;

a module configured to provide a function for acquiring a user's operation history for the apparatus to be controlled;

a module configured to provide a function for judging the user's skill level and a corresponding control program type, from plural control program types, to be transmitted to the portable information terminal, based upon the operation history;

a module configured to provide a function for transmitting a control program of the type thus judged to the portable information terminal;

a module configured to provide a function for checking whether or not the version of a control program that has already been transmitted to the portable information terminal matches a most recent version, and a function for transmitting the most recent version of the control program to the portable information terminal when the version thus checked does not match the most recent version; and a module configured to provide a function for again acquiring the user's operation history for the apparatus to be controlled when the most recent version of the control program is transmitted to the portable information terminal, and a function for judging, based upon the operation history thus acquired, the control program type to be transmitted to the portable information terminal, wherein the control program judgment module lowers the user's skill level when the operation history includes less than a predetermined number of times operating one or more predetermined functions on the apparatus to be controlled.

6. A portable information terminal comprising:

a device information acquisition unit configured to acquire, from an apparatus to be controlled, device information with respect to the apparatus to be controlled;

a control program request unit configured to notify a management server of the device information with respect to the apparatus to be controlled, and to request the management server to transmit a control program for remotely controlling the apparatus to be controlled;

a control program acquisition unit configured to acquire the control program from the management server, and to instruct a control program storing unit to store the control program thus acquired;

a control program executing unit configured to execute the control program stored in the control program storing unit so as to remotely control the apparatus to be controlled;

a history recording unit configured to instruct a history storing unit to record operation history for the apparatus to be controlled by means of the control program;

a history transmitting unit configured to transmit the operation history held by the history storing unit to the management server; and a version checking unit configured to request the management server to check whether or not the control program stored in the control program storing unit matches a most recent version, wherein, when the control program stored in the control program storing unit does not match the most recent version, the control program acquisition unit is configured to acquire, from the management server, the most recent version of the control program of a type judged based upon the operation history, wherein the management server provides the control program, from plural control programs, to the control program acquisition unit according to a user's skill level that is determined based on the operation history, and wherein the user's skill level lowered at the management server when the operation history includes less than a predetermined number of times operating one or more predetermined functions on the apparatus to be controlled.

7. A user support method comprising:
a device information acquisition unit included in a computer acquiring, from an apparatus to be controlled, device information with respect to the apparatus to be controlled;
a control program request unit included in the computer notifying a management server of the device information with respect to the apparatus to be controlled, and requesting the management server to transmit a control program for remotely controlling the apparatus to be controlled;
a control program acquisition unit included in the computer acquiring the control program from the management server, and instructing a control program storing unit to store the control program thus acquired;
a control program executing unit included in the computer executing the control program stored in the control program storing unit so as to remotely control the apparatus to be controlled;
a history recording unit included in the computer instructing a history storing unit to record operation history for the apparatus to be controlled by means of the control program;
a history transmitting unit included in the computer transmitting the operation history held by the history storing unit to the management server;
a version checking unit included in the computer requesting the management server to check whether or not the control program stored in the control program storing unit matches a most recent version; and
when the control program stored in the control program storing unit does not match the most recent version, the control program acquisition unit acquiring, from the management server, the most recent version of the control program of a type judged based upon the operation history, wherein the management server provides the control program, from plural control programs, to the control program acquisition unit according to a user's skill level that is determined based on the operation history, and wherein the user's skill level is lowered at the management server when the operation history includes less than a predetermined number of tunes operating one or more predetermined functions on the apparatus to be controlled.

8. A computer program stored in a non-transitory computer readable medium comprising:
a module configured to provide a function for acquiring, from an apparatus to be controlled, device information with respect to the apparatus to be controlled;
a module configured to provide a function for notifying a management server of the device information with respect to the apparatus to be controlled, and requesting the management server to transmit a control program for remotely controlling the apparatus to be controlled;
a module configured to provide a function for acquiring the control program from the management server, and instructing a control program storing unit to store the control program thus acquired;
a module configured to provide a function for executing the control program stored in the control program storing unit so as to remotely control the apparatus to be controlled;
a module configured to provide a function for instructing a history storing unit to record operation history for the apparatus to be controlled by means of the control program;
a module configured to provide a function for transmitting the operation history held by the history storing unit to the management server;
a module configured to provide a function for requesting the management server to check whether or not the control program stored in the control program storing unit matches a most recent version; and
a module configured to provide a function for acquiring, from the management server, the most recent version of the control program of a type judged based upon the operation history when the control program stored in the control program storing unit does not match the most recent version, wherein the management server provides the control program, from plural control programs, to the control program acquisition module according to a user's skill level that is determined based on the operation history, and wherein the user's skill level is lowered at the management server when the operation history includes less than a predetermined number of times operating one or more predetermined functions on the apparatus to be controlled.

9. A user support system comprising a portable information terminal and a management server configured to transmit, to the portable information terminal, a control program for remotely controlling an apparatus to be controlled via the portable information terminal,
wherein the management server comprises:
a control program storing unit configured to store a plurality of types of control programs that correspond to skill levels of a user of the portable information terminal with respect to the apparatus to be controlled, as the control programs;
a control program request receiving unit configured to receive a request for the control program from the portable information terminal;
a device information acquisition unit configured to acquire device information with respect to the apparatus to be controlled;
a history acquisition unit configured to acquire a user's operation history for the apparatus to be controlled;
a control program judgment unit configured to judge, based upon the operation history, the control program type to be transmitted to the portable information terminal;
a control program transmitting unit configured to read out the control program of the type thus judged from the control program storing unit, and to transmit the control program thus read out to the portable information terminal; and
a version management unit configured to check whether or not the version of a control program that has already been transmitted to the portable information terminal matches a most recent version of the control program stored in the control program storing unit, and to instruct the control program transmitting unit to transmit the most recent version of the control program to the portable information terminal when the version thus checked does not match the most recent version, and wherein, when the control program transmitting unit transmits the most recent version of the control program to the portable information terminal, the control program judgment unit is configured to again acquire the user's operation history for the apparatus to be controlled, and to judge, based upon the operation history, the control program type to be transmitted to the portable information terminal, and wherein the portable information terminal comprises:
  a device information acquisition unit configured to acquire, from the apparatus to be controlled, device information with respect to the apparatus to be controlled;
  a control program request unit configured to notify the management server of the device information with respect to the apparatus to be controlled, and to request the management server to transmit a control program for remotely controlling the apparatus to be controlled;
  a control program acquisition unit configured to acquire the control program from the management server, and to instruct a control program storing unit to store the control program thus acquired;
  a control program executing unit configured to execute the control program stored in the control program storing unit so as to remotely control the apparatus to be controlled;
  a history recording unit configured to instruct a history storing unit to record operation history for the apparatus to be controlled by means of the control program;
  a history transmitting unit configured to transmit the operation history held by the history storing unit to the management server; and
  a version checking unit configured to request the management server to check whether or not the control program stored in the control program storing unit matches the most recent version, and wherein, when the control program stored in the control program storing unit does not match the most recent version, the control program acquisition unit is configured to acquire, from the management server, the most recent version of the control program of a type judged based upon the operation history, and wherein the control program judgment unit the user's skill level when the operation history includes less than a predetermined number of times operating one or more predetermined functions on the apparatus to be controlled.

* * * * *